(12) United States Patent
Shampine et al.

(10) Patent No.: US 9,453,404 B2
(45) Date of Patent: Sep. 27, 2016

(54) MECHANICAL TUBE WAVE SOURCES AND METHODS OF USE FOR LIQUID FILLED BOREHOLES

(75) Inventors: Rod Shampine, Houston, TX (US); Philip F. Sullivan, Bellaire, TX (US); Douglas E. Miller, Boston, MA (US); Dominque Guillot, Fontenay aux Roses (FR); Francois M. Auzerais, Boston, MA (US); Richard T. Coates, Middlebury, CT (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 202 days.

(21) Appl. No.: 13/015,985

(22) Filed: Jan. 28, 2011

(65) Prior Publication Data
US 2011/0267922 A1 Nov. 3, 2011

Related U.S. Application Data

(60) Provisional application No. 61/337,042, filed on Jan. 29, 2010.

(51) Int. Cl.
| | |
|---|---|
| *E21B 47/00* | (2012.01) |
| *E21B 47/09* | (2012.01) |
| *E21B 47/10* | (2012.01) |

(52) U.S. Cl.
CPC .......... *E21B 47/0005* (2013.01); *E21B 47/091* (2013.01); *E21B 47/101* (2013.01); *G01V 2210/12* (2013.01)

(58) Field of Classification Search
CPC ............... G01V 2210/10; G01V 2210/12; E21B 47/0005; E21B 47/091; E21B 47/101
USPC .................... 367/25; 251/337, 336, 63, 63.4
See application file for complete search history.

(56) References Cited

U.S. PATENT DOCUMENTS

| | | | |
|---|---|---|---|
| 2,751,183 A | * | 6/1956 | Crookston ...................... 251/31 |
| 3,254,524 A | | 6/1966 | Tannenberg |
| 3,376,949 A | | 4/1968 | Baker et al. |
| 3,679,021 A | * | 7/1972 | Goldberg ...................... 181/120 |
| 3,979,724 A | | 9/1976 | Silverman et al. |

(Continued)

FOREIGN PATENT DOCUMENTS

WO 2009086279 7/2009

OTHER PUBLICATIONS

Sercel, Marine Sources, Ahead of the Curve, Brochure, Jan. 2011, pp. 2-29, France.

(Continued)

*Primary Examiner* — Luke Ratcliffe
*Assistant Examiner* — Hovhannes Baghdasaryan
(74) *Attorney, Agent, or Firm* — Andrea E. Tran; Tim Curington

(57) ABSTRACT

The current application discloses methods and systems for generating mechanical tube waves in fluid filled boreholes penetrating subterranean formations. In one embodiment, the system of the current application comprises an energy storage chamber; a fast operating valve connected to the energy storage chamber; a pipe connected to the valve and extending to the liquid-filled borehole; wherein the energy storage chamber contains a first pressure that is substantially different from a second pressure in the pipe so that a fast operation of the valve generates a tube wave in the pipe.

7 Claims, 16 Drawing Sheets

(56) References Cited

U.S. PATENT DOCUMENTS

| | | | |
|---|---|---|---|
| 4,993,001 A * | 2/1991 | Winbow et al. | 367/144 |
| 5,361,837 A * | 11/1994 | Winbow | 166/249 |
| 5,472,049 A * | 12/1995 | Chaffee et al. | 166/250.1 |
| 6,401,814 B1 | 6/2002 | Owens et al. | |
| 8,047,285 B1 * | 11/2011 | Smith | 166/260 |
| 2002/0162660 A1 | 11/2002 | Depiak et al. | |
| 2004/0069530 A1 * | 4/2004 | Prain et al. | 175/40 |
| 2008/0236935 A1 | 10/2008 | Coates et al. | |
| 2008/0239872 A1 | 10/2008 | Miller et al. | |
| 2009/0006005 A1 | 1/2009 | Segal et al. | |
| 2009/0072180 A1 | 3/2009 | Johnson et al. | |
| 2009/0159272 A1 * | 6/2009 | Auzerais et al. | 166/250.01 |

OTHER PUBLICATIONS

Raymond, S., Hollow Glass Spheres Under Pressure in the Ocean—Experiments Show Interesting Properties, Sep. 2010, pp. 537-544, San Diego.

PCT/IB2011/050393—International Search Report dated Oct. 6, 2011.

Laake et al., "A Generator for High Pressure Pulses in Liquids", Journal of Sound and Vibration, 1989, vol. 131, No. 2, pp. 295-304.

\* cited by examiner

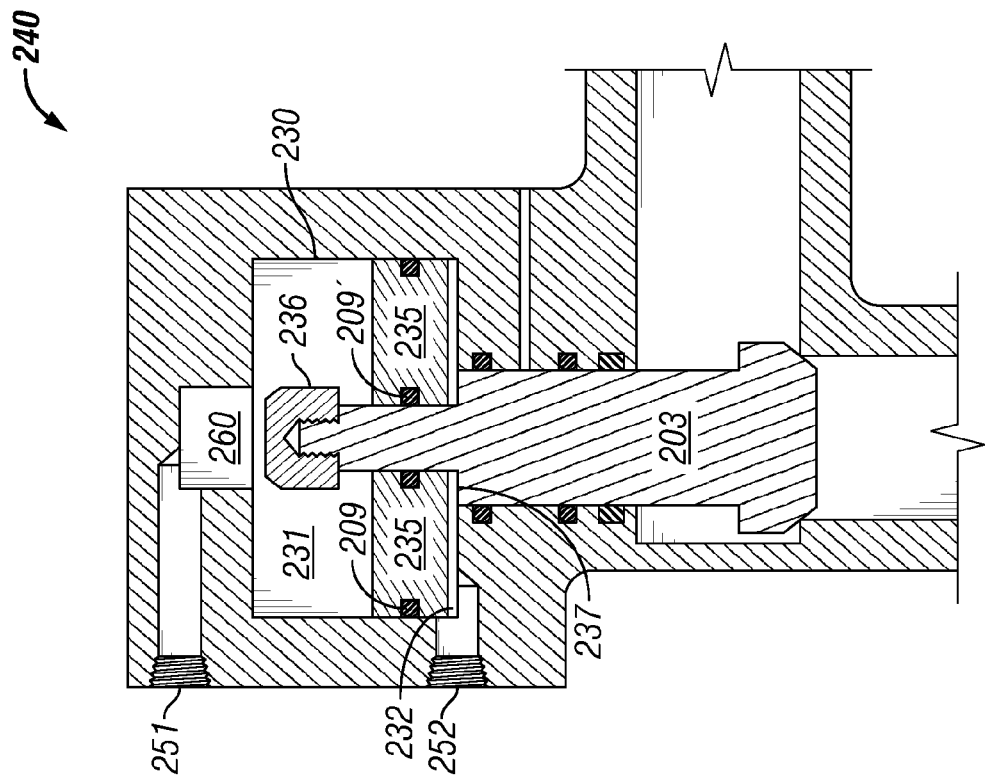
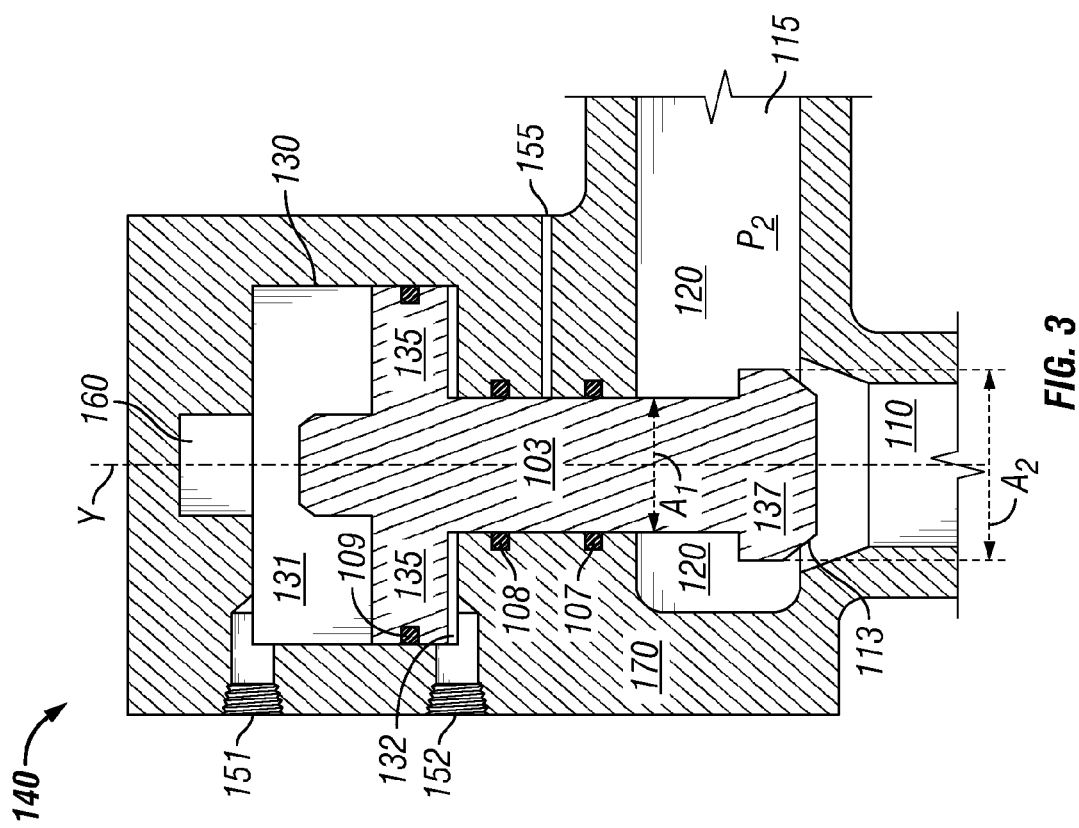

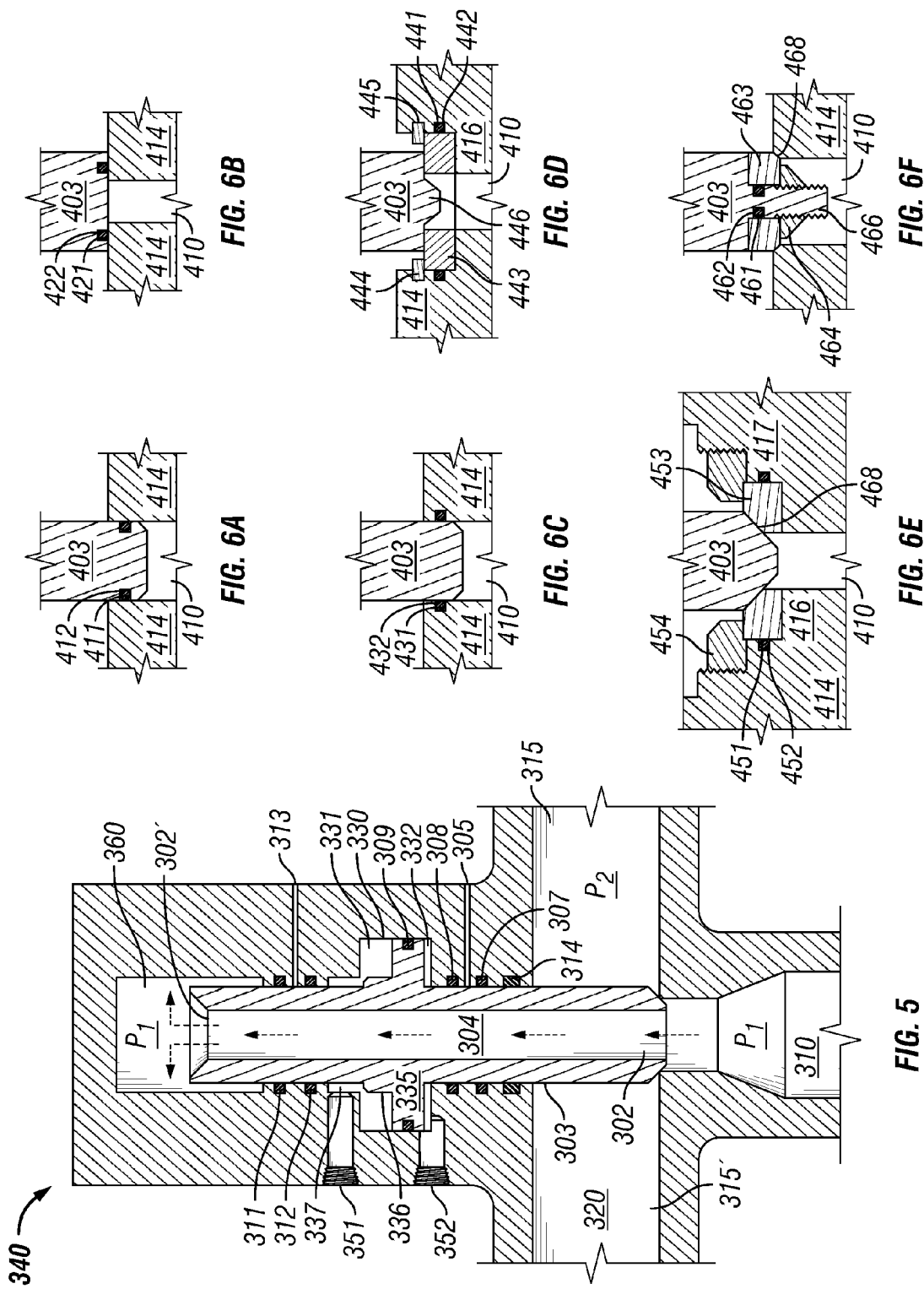

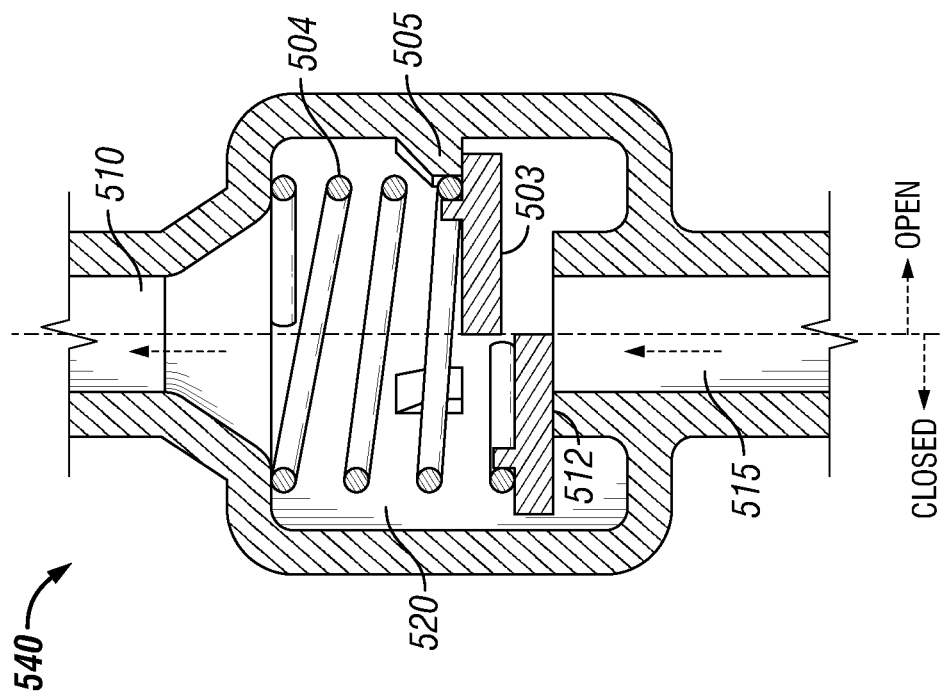
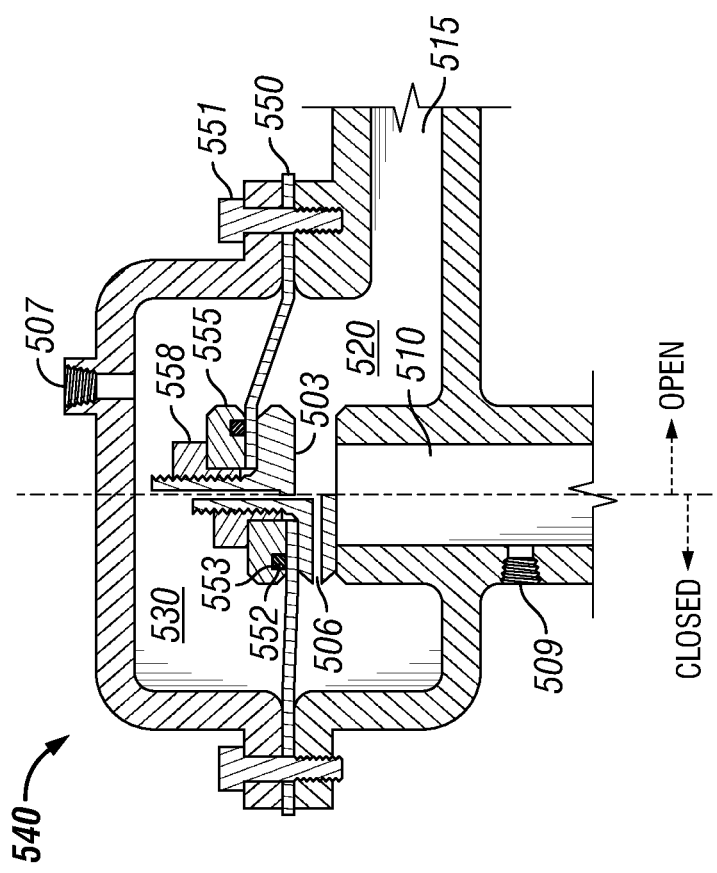
FIG. 8A
FIG. 7

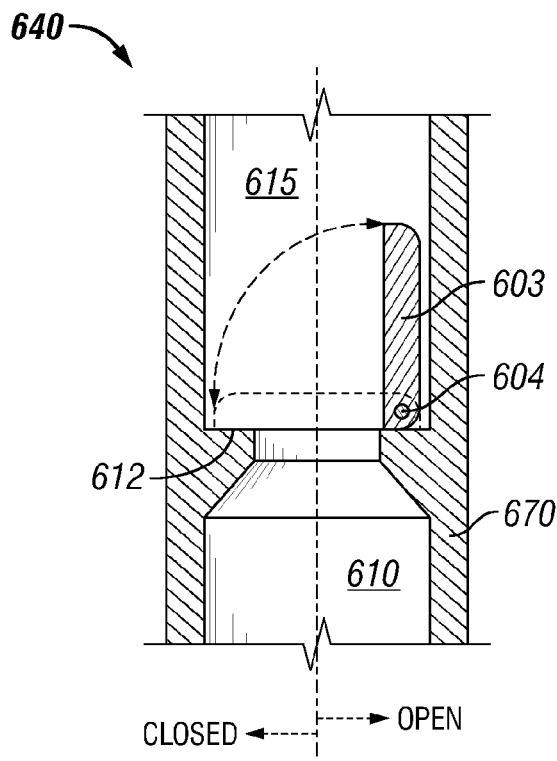
FIG. 9
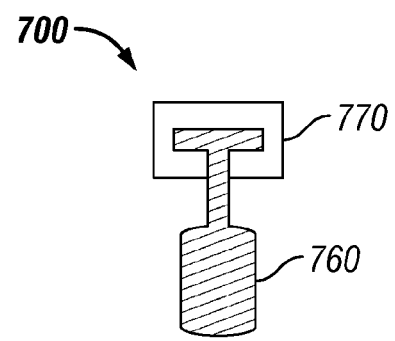
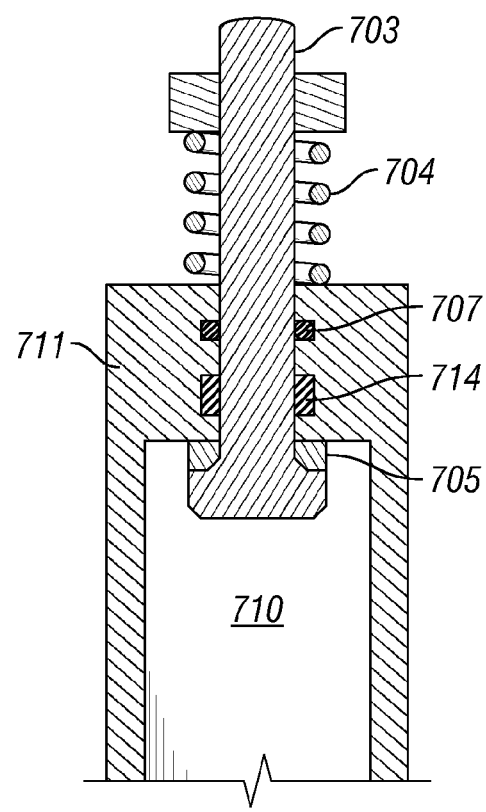
FIG. 10

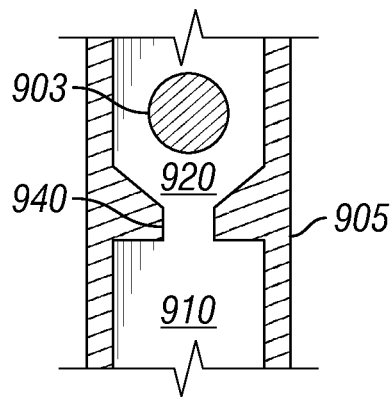
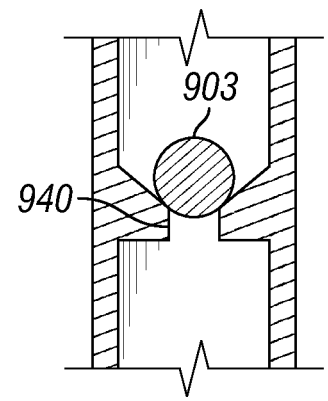
FIG. 13A    FIG. 13B
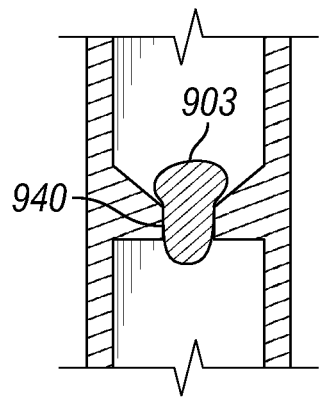
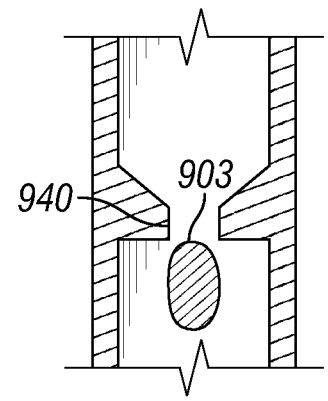
FIG. 13C    FIG. 13D

MECHANICAL TUBE WAVE SOURCES AND METHODS OF USE FOR LIQUID FILLED BOREHOLES

RELATED APPLICATION DATA

This application claims priority of U.S. Provisional Patent Application Ser. No. 61/337,042 filed Jan. 29, 2010, which is incorporated by reference herein.

BACKGROUND

The statements in this section merely provide background information related to the present disclosure and may not constitute prior art. All references discussed herein, including patent and non-patent literatures, are incorporated by reference into the current application.

Tube waves, otherwise known as Stoneley waves, are plane pressure waves that propagate through a tubular medium, or an annulus. In some cases, these waves reflect from changes in the characteristic impedance of the medium. Examples of such changes include: pipe diameter, closed end, free surface, gas bubble, compressibility, density, speed of sound, pipe elastic modulus, pipe supporting material (or lack thereof), holes with flow capacity, etc. With some knowledge of the wellbore geometry and/or the speed of the tube wave, the complex reflection patterns can be interpreted to yield useful information about the wellbore. Some examples of such information include locating the top of cement, identifying the setting of cement, locating which perforations in a well are passing fluid, confirming shifting of control valves, locating coiled tubing relative to downhole features, etc. One particular advantage of using methods based upon tube waves, is information about the bottom of the well can be gleaned using only surface equipment. A particular challenge in applying these techniques is developing a repeatable and reliable means to generate useful tube wave forms. Figures of merit for these sources include rate of pressure change, frequency spectrum, peak power, total energy, repeatability, and reliability.

U.S. Pat. No. 3,254,524 discloses a method and apparatus for testing tubular equipment such as a pipe. A mechanical shock wave is generated by suddenly obstructing a moving fluid, causing a local expansion of the fluid followed by a reversely directed pressure or shock wave that is propagated through the fluid, a phenomenon commonly referred to as "water hammer". A centrifugal pump is employed to move the fluid in a closed circuit of pipes and to maintain the fluid under a constant pressure. A fast-acting valve is connected to the pipe line downstream from the test specimen. A sudden close of the valve generates a shock wave that propagates reversely through the test specimen and therefore measures the feature of the test specimen.

U.S. Pat. No. 3,979,724 discloses a method and apparatus for determining the position of the bottom end of a long pipe in a deep water-filled borehole. A shock wave is first generated in the water at the surface end of the pipe. The shock wave travels down the pipe to the bottom end of the pipe and passes into the liquid in the borehole, generating an expanding seismic wave in the earth. A plurality of geophones is set out at the surface of the earth to detect the arrival of the seismic wave, based on which the position of the end of the pipe is calculated. In some embodiments, a chamber filled with a combustible mixture is detonated by a spark plug to make the shock wave. In some other embodiments, a chamber containing one or more explosive materials is detonated to produce the shock wave. In some further embodiments, a high pressure liquid is provided through a pipe and a valve to a disc that is sealed across an opening connected to a chamber. The disc is frangible and at a selected pressure of liquid on its surface, will fracture and explosively permit the pressurized liquid in the pipe to expand into the chamber and initiate a shock wave therein.

U.S. Pat. No. 6,401,814 discloses a method for determining the location or displacement of a cementing plug during a cementing operation by transmitting one or more pressure pulses through the fluid in the wellbore. The pressure pluses are reflected off of the plug and received by a pressure sensor. Information regarding the timing of the reflected pressure pulses may be used to determine the location or displacement of the plug. A valve can be opened momentarily to vent pressure from a flowline and, thus, transmit a negative pressure pulse through the fluid in the casing string. Alternatively, an air gun can be used to transmit a positive pressure pulse through the fluid in the casing string. Alternatively, a pump can be operated in a manner to transmit a pressure pulse, such as by varying the pump's motor speed or by momentarily disengaging the motor from the pump, etc.

As disclosed in published U.S. Pat. App. No. 20080239872 A1, achieving accurate, real-time measurements during well completion and stimulation treatments has long been a goal in the oil and gas industry. Accurate measurement of bottom hole pressure during fracture treatments, for example, would allow an operator to observe fracture growth trends in real-time, and change treatment conditions accordingly. Similarly, location of balls seated in perforations would facilitate acid diversion treatments. However, real-time measurements of borehole completion and stimulation treatments are rarely performed with current technology because the borehole environment is hostile to wiring and tends to rapidly attenuate electromagnetic signals. For example, the abrasiveness of the fracturing slurry is destructive to any exposed cable placed in the wellbore for delivering data to the surface.

U.S. Pat. App. No. 20090159272 A1 discloses that tube waves may be used for detection and monitoring of feature state to enhance stimulation operations and remediate failure conditions. For example, proper sealing of perforations may be confirmed based on lack of a reflection of a tube wave by the perforations. Alternatively, at least one of amplitude, frequency, attenuation, dispersion and travel time associated with a tube wave and reflection may be used to determine feature state. If a sealant fails during treatment then the failure condition is indicated by appearance of a tube wave reflection. Consequently, the stimulation operation can be stopped in a timely manner, and remediation by means, for example, of pumping diversion fluid or dropping of balls, can be reinitiated until the difference between the expected responses and responses measured by the instrument along the segment to be stimulated confirm that sealing has taken place and that stimulation of the intended zone can resume. Further, specific remediation steps may be selected based on response of the borehole system to tube waves. The efficacy of the selected remediation steps may also be determined by response of the borehole system to tube waves during or after execution of those steps.

U.S. Pat. App. No. 20080236935 A1 discloses that tube waves may be used to transmit an indication of the depth at which a condition is detected in a well. In particular, the depth is calculated based on the difference in arrival time at the surface of a first tube wave which propagates directly upward in the borehole and a second tube wave which initially travels downward and is then reflected upward. The tube waves may be generated by a canister designed to implode at a certain pressure.

WO2009086279 discloses methods and systems for measuring acoustic signals in an annular region. The system includes a tool housed in a tool housing for deployment downhole in a borehole, and an acoustic transducer mounted on the tool. The acoustic signals can be measured by sensors mounted on a borehole wall or within the downhole tool.

However, there remains a need to further improve the system and method for generating tube waves for use in liquid filled boreholes penetrating subterranean formations.

SUMMARY

According to one aspect, there is provided a system for generating tube waves in a liquid-filled borehole penetrating a subterranean formation. The system comprises an energy storage chamber, a fast operating valve connected to the chamber, a pipe connected to the valve and extending to the liquid-filled borehole, where said energy storage chamber contains a first pressure that is substantially different from a second pressure in the pipe so that a fast operation of the valve generates a tube wave in the pipe. In some embodiments, the system, wherein the first pressure is higher than the second pressure and the generated tube wave is a positive tube wave. In some other embodiments, the first pressure is lower than the second pressure and the generated tube wave is a negative tube wave.

The energy storage chamber may contain a compressible medium, which may be selected from a group consisting of air, nitrogen, alcohol, ethyl ether, water, drilling fluid, cement slurry, oil, and their mixtures. In one example, the compressible medium is compressed nitrogen.

In one illustrated embodiment, the energy storage chamber comprises a plurality of accumulators connected to a common hub, with each accumulator containing compressed nitrogen. Such Nitrogen may be emplaced at a pressure up to 15,000 psi. In one embodiment, such nitrogen was emplaced at a pressure up to 5,000 psi.

The system for generating tube waves in a liquid-filled borehole may optionally include a charger that is connected to the energy storage chamber for pre-charging the energy storage chamber. The charger can be a pump, a compressor, a vent line leading to atmospheric pressure, a plunger that can be moved in or out, or a vacuum, depending on the system setup.

In some embodiments, the generated tube wave is at a pressure that is at least 50 psi above or below the pressure in the pipe. In some other embodiments, the generated tube wave is at a pressure that is at least 200 psi above or below the pressure in the pipe. In some further embodiments, the generated tube wave is at a pressure that is at least 500 psi above or below the pressure in the pipe. In further embodiments where extreme pressure differences are desired, the generated wave may be near the vapor pressure of the fluid or as high as the rated working pressure of the tubulars conveying the pressure wave.

Moreover, the fast operating valve is configured to open or close a flow path of the medium through the valve in less than or equal to approximately 500 milliseconds. In some embodiments, the fast operating valve is configured to open or close a flow path of the medium through the valve in approximately 50 milliseconds. In some other embodiments, the fast operating valve is configured to open or close a flow path of the medium through the valve in approximately 100 milliseconds. In some further embodiments, the fast operating valve is configured to open or close a flow path of the medium through the valve in approximately 200 milliseconds. In one specific embodiment, the fast operating valve was configured to open or close a flow path of the medium through the valve in approximately 120 milliseconds.

In one specific example, the fast operating valve is a rotary valve that operates on a quarter turn by a pneumatic actuator assisted in opening by a spring. In some other examples, the valve is a regenerative valve, including but not limited to poppet valves, diaphragm valves, flow actuated valves, etc. A regenerative valve is one in which once the motion of the valve has been initiated by an external signal, the motion of the valve is driven by either pressure differences or flow forces internal to the valve such that it will complete its motion even in the event that the external signal is removed. In one embodiment, there is provided a regenerative valve comprising a control chamber, a treating chamber disposed below the control chamber but not in fluid communication with the control chamber, and a poppet that extends from the control chamber to the treating chamber and is capable of reciprocating within the control chamber and the treating chamber. The treating chamber can be connected to the energy storage chamber via an upstream port and the fluid-filled borehole via a downstream port.

In one embodiment, the poppet comprises a control piston disposed inside the control chamber, a treating seat disposed inside the treating chamber, and a stem connecting the control piston and the treating seat. The control piston divides the control chamber into an upper sub-chamber and a lower sub-chamber that are not in fluid communication with each other. The upper sub-chamber is in fluid communication with an outside of the control chamber via an upper port, and the lower sub-chamber is in fluid communication with the outside of the control chamber via an lower port, so that a control fluid can be injected into or depleted from the upper sub-chamber or the lower sub-chamber in order to move the poppet up or down.

In one case, the control piston is a monolithic component of the poppet. In another case, the control piston is a separate component from the poppet, and the control piston is slidingly connected to a narrowed stem of the poppet and is further restricted by a stopper fastened to a top of the poppet.

In an improved version of the poppet valve, a buffering chamber is provided above the control chamber but not in fluid communication with the control chamber. The poppet extends from the buffering chamber through the control chamber to the treating chamber and is capable of reciprocating within the buffering chamber, the control chamber, and the treating chamber. The poppet contains a hollow passage so that the downstream port is in fluid communication with the buffering chamber.

In one embodiment, the treating seat has a cross sectional profile that is larger than that of the stem of the poppet. In another embodiment, the treating seat has a cross sectional profile that is substantially the same as that of the stem of the poppet. In a further embodiment, the treating seat has a cross sectional profile that is smaller than that of the stem of the poppet.

In several illustrated embodiments, the treating seat is configured to engage a structure at the juncture of the downstream port and the treating chamber and seal off a fluid passage from the treating chamber to the downstream port. In one case, the treating seat seals off the fluid passage by a seal disposed in a retaining space formed on a side surface of the treating seat of the poppet. In another case, the treating seat seals off the fluid passage by a seal disposed in a retaining space formed on a bottom surface of the treating seat of the poppet. In a further case, the treating seat seals off the fluid passage by a seal disposed in a retaining space formed on an inner side surface of the downstream port. In an even further case, the treating seat seals off the fluid passage by engaging a disposable component located at an opening of the downstream port to the treating chamber. In yet another case, the treating seat seals off the fluid passage by a disposable component located at a tip of the poppet.

The regenerative valve can also be a regenerative diaphragm valve which may comprise a control chamber, a treating chamber disposed below the control chamber, a diaphragm disposed between the control chamber and the treating chamber, and a poppet disposed at a center of the diaphragm. The treating chamber can be connected to the energy storage chamber via an upstream port and the fluid-filled borehole via a downstream port. The control chamber can be connected to an outside of the valve via a control port. The poppet can be substantially in the shape of a reversed "T" and contain an orifice through a center of the poppet, which enables the control chamber to be in fluid communication with the treating chamber under substantial restrictions.

The regenerative valve can also be a pop-safety relief type valve which comprises an upstream port, a downstream port, a poppet chamber formed between the upstream port and the downstream port, and a poppet disposed in the poppet chamber. Said poppet chamber comprises a section where the poppet is a substantial portion of the cross section of the chamber and the chamber has a larger cross section than the upstream port. A spring can be provided to connect the poppet to the downstream port and push the poppet towards the upstream port. A stopper can be optionally included in the poppet chamber to restrict a movement of the poppet. An orifice can also be provided around a center of the poppet that allows a fluid to pass but with substantial restrictions. Moreover, a trigger can be provided so that when the trigger is engaged, it holds the poppet in a first position, and when the trigger is released, the poppet moves to a second position.

When the regenerative valve is a flow actuated tube wave valve, it may comprise an upstream port, a downstream port, and a swing check disposed between the upstream port and the downstream port. The swing check can be pivotally connected to an inner surface of the valve and is capable of assuming one of two positions: a first position where the swing check is substantially parallel to a longitudinal axis of the valve thereby allowing fluids to pass between the upstream port and the downstream port, and a second position where the swing check is substantially perpendicular to the longitudinal axis of the valve thereby obstructing fluids from passing between the upstream port and the downstream port.

According to another aspect of the application, there is provided a system for generating tube waves in a liquid-filled borehole penetrating a subterranean formation, where the system comprises a weight, an actuator that controls a movement of the weight, a plunger, and a pipe having a top end and a bottom end, where the top end is transverse by the plunger and is not in fluid communication with an outside of the pipe, and the bottom end extends to the liquid-filled borehole for delivering the tube waves generated by the system. The weight is configured to render mechanical impact on the plunger upon an operation of the actuator.

In one embodiment, the system further comprises a spring disposed between the plunger and a top surface of the top end the pipe so that the spring exerts an upward force upon the plunger. In another embodiment, the system may comprise a spring disposed between the plunger and a bottom surface of the top end of the pipe so that the spring exerts a downward force upon the plunger.

According to further aspect of the application, there is provided a system for generating tube waves in a liquid-filled borehole penetrating a subterranean formation, where the system comprises a housing that is connected to a cavity on one end and a downstream port on the other end that is further connected to the liquid-filled borehole; a flyer disposed inside the housing, where said flyer further comprises a hollow space around a center of the flyer; and a piston disposed inside the hollow space of the flyer; where the piston is configured to move up and down inside the hollow space to exert mechanical impacts on the flyer, which in turn moves up and down inside the housing to generate tube waves in the downstream port.

The hollow space of the flyer can be further divided into an upper space and a lower space that are not in fluid communication with each other so that injecting fluids into or depleting fluids out of the upper space or the lower space moves the piston up or down inside the hollow space of the flyer. Optionally, the pressure in the cavity is equalized with the pressure in the downstream port. Optionally, the cavity is made of elastic materials and contains a low bulk modulus fill fluid. Also optionally, a first spring is provided to connect the flyer to the cavity and a second spring is provided to connect the flyer to the downstream port.

According to yet another aspect of the application, there is provided a system for generating tube waves in a liquid-filled borehole penetrating a subterranean formation, where the system comprises a pipe that connects an upstream port on one side and a downstream port on another side; an orifice formed inside the pipe around the juncture of the upstream port and the downstream port; and a deformable object that is configured to assume a first position wherein the deformable object lodges at the orifice and blocks a fluid communication between the upstream port and the downstream port and a second position where the deformable object deforms and passes through the orifice and reopens the fluid communication between the upstream port and the downstream port. In one embodiment, the deformable object is made of degradable material, such as collagen or the plastic poly-lactic acid.

According to an even further aspect of the application, there is provided a system for generating tube waves in a liquid-filled borehole penetrating a subterranean formation, where the system comprises a stinger having a first end and a second end; an actuator connected to the first end of the stinger; a plate formed at the second end of the stinger, said plate having a cross-sectional profile that is larger than that of the stinger; where the actuator is configured to move the stinger up and down in the liquid-filled borehole and the plate generates tube waves in the liquid-filled borehole. This system is particularly useful in the liquid-filled borehole having a free liquid surface under which the second end of the stinger is immersed.

In some cases, the system further comprises a first pressure transducer that is positioned proximate to the second end of the stinger and is connected to a ground surface via a first cable. The first cable can run within an annulus formed between the borehole and the stinger, and is fastened to an external surface of the tube by a clamp. In some other cases, the system further comprises a second pressure transducer that is position at a bottom of the plate and is connected to a ground surface via a second cable. The second cable may run within the stinger. Optionally, a suspension system is provided to afford compliance for the stinger to move up and down.

According to an additional aspect of the application, there is provided an apparatus for generating tube waves in a liquid-filled borehole penetrating a subterranean formation, where the apparatus comprises a canister covered by a microscope slide. In one embodiment, the canister is a glass tube such as a centrifuge tube. The canister may further contain a weighting material.

BRIEF DESCRIPTION OF THE DRAWINGS

These and other features and advantages will be better understood by reference to the following detailed description when considered in conjunction with the accompanying drawings.

FIG. 3 is a cross-sectional view of a regenerative valve according to one embodiment of the current application.

FIG. 4 is a cross-sectional view of a regenerative valve according to one embodiment of the current application.

FIG. 5 is a cross-sectional view of a regenerative valve according to one embodiment of the current application.

FIGS. 6A-6F illustrate various sealing mechanisms that can be employed in the embodiments of the current application.

FIG. 7 is a cross-sectional view of a regenerative diaphragm valve according to one embodiment of the current application.

FIG. 9 is a cross-sectional view of a flow actuated valve according to one embodiment of the current application.

FIG. 10 is a cross-sectional view of a hammer source according to one embodiment of the current application.

FIGS. 13A-13D are cross-sectional views of a system involving pumping objects through an orifice to generate tube waves according to one embodiment of the current application.

DETAILED DESCRIPTION OF SOME ILLUSTRATIVE EMBODIMENTS

Embodiments of the current application generally relate to systems and methods for generating tube waves for use in wellbores penetrating subterranean formations. The following detailed description illustrates embodiments of the application by way of example and not by way of limitation. All numbers disclosed herein are approximate values unless stated otherwise, regardless whether the word "about" or "approximately" is used in connection therewith. The numbers may vary by up to 1%, 2%, 5%, or sometimes 10% to 20%. Whenever a numerical range with a lower limit and an upper limit is disclosed, any number falling within the range is specifically and expressly disclosed.

Figure 1:
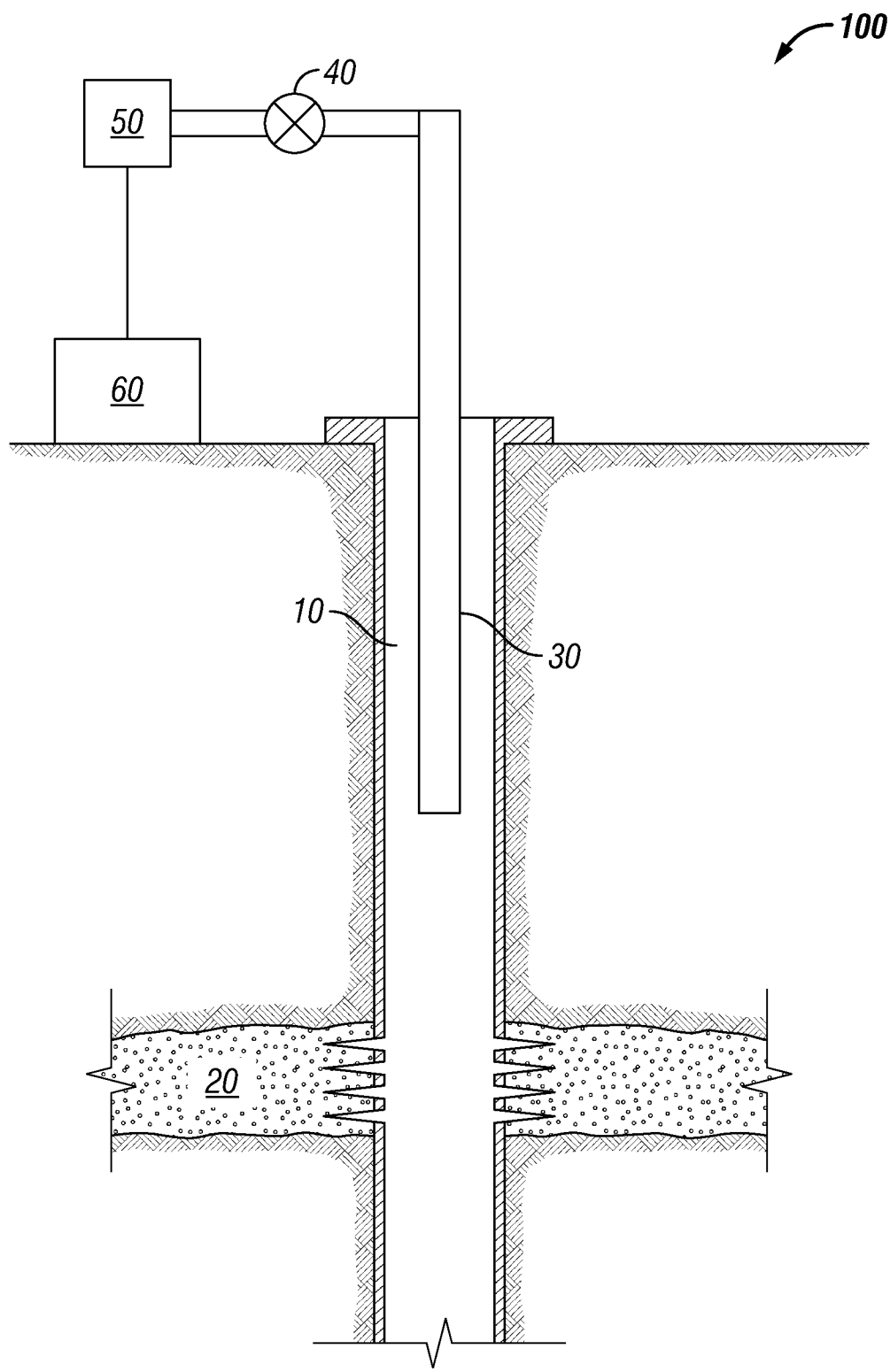
FIG. 1 is a schematic representation of a tube wave generating system generator according to one embodiment of the current application.

FIG. 1 shows a system 100 for generating tube waves for use in a borehole 10 that penetrates a subterranean formation 20 containing, for example, hydrocarbons. The system 100 comprises an energy storage chamber 50, a fast operating valve 40 which is connected to the energy storage chamber 50, and a pipe 30 which is connected to the valve 40 and extends to the wellbore 10. The energy storage chamber 50 may contain a compressible medium, such as air, nitrogen, alcohol, ethyl ether, water, drilling fluids, cement slurries, oil, etc. that can be subject to an elevated pressure that is substantially higher than the pressure in the borehole 10. In such an embodiment, a rapid opening of the valve 40 may generate a tube wave that starts with a positive or increasing pressure in the borehole 10 as fluid rapidly moves from the energy storage chamber 50, through the valve 40 and into the pipe 30 to relieve the high pressure down to the wellbore pressure. The resulting tube wave is referred to as a positive tube wave. Alternatively, the energy storage chamber 50 can be substantially vacuum or under a pressure that is significantly lower than the pressure in the borehole 10. In such an event, a fast opening of the valve 40 may generate a tube wave that starts with a negative or falling pressure in the borehole 10 as fluid from the wellbore 10 moves into the pipe 30 and further through valve 40 to finally bring the pressure in the energy storage chamber 50 to substantially the wellbore pressure. The resulting tube wave is referred to as a negative tube wave. In both types of systems the pressure wave generated frequently consists of a complex waveform of which only the beginning part is well described by the "positive" and "negative" language above, but this initial pressure change is what is used to name these waves. Positive is to be interpreted as being positive with respect to or higher than the wellbore pressure with negative being similarly interpreted to be lower than the well bore pressure. A further type of wave consists of an initial peak immediately followed by a peak of opposite sign and similar magnitude. Such a wave is referred to as a doublet.

Optionally, system 100 may further comprise a charger 60 that is positioned at the surface of the wellsite and connected to the energy storage chamber 50 to pre-charge the energy storage chamber 50 before opening valve 40. When a positive pressure tube wave is needed, the charger 60 can be a pump, an actuated plunger, or compressor that compresses the medium contained in the energy storage chamber 50 and increases the pressure in the energy storage chamber 50.

When a negative pressure tube wave is desired, the charger 60 may be a suction device or a vent that depletes the medium contained in the energy storage chamber 50 to create a pressure below that in the borehole 10.

The energy storage chamber 50 may comprises one or more sub-chambers (not shown) that are in fluid communication with each other, either in series or in parallel. In one embodiment, the energy storage chamber 50 comprises a plurality of metal containers (called "accumulators") that enclose a compressed air, such as nitrogen. The accumulators can be substantially cylindrical in shape, with approximately 80 mm in diameter and 388 mm in length. An internal mechanism is provided to allow a charge of gas or fluid to be retained inside the accumulator at some initial or precharge pressure This mechanism allows the external fluid to enter the accumulator and further compress the pre-charged media to a higher pressure. The fluid that has entered may be later allowed to leave, at which point the internal media will resume substantially its pre-charged pressure. In the case of gas as a pre-charge media, the compression and expansion of the gas during this cycle may occur on a time scale short enough that there is little heat exchange with the structures, leading to significant changes in the temperature of the gas and a reduction of the energy delivered while discharging the external fluid. This loss may be mitigated by using internal structures (such as open cell foam, liquids, and open metal forms like mesh and perforated metal) to provide heat during expansion. In the case of a media that is substantially liquid at room temperature this pre-charge pressure is sometimes atmospheric pressure or the vapor pressure of the fluid. Each accumulator may contain an initial pressure up to 15,000 psi in the case where the charging and working pressure of the chamber are 15,000 psi as is common in oilfield treating equipment. The charging pressure may be substantially higher than the working pressure of the pipe 30 or the wellbore 10 due to pressure losses in the fast opening valve 40. In some cases, the pre-charge for an accumulator used to generate positive tube waves will be pre-charged to approximately ⅓ of the planned charging pressure. In some cases, this pre-charge pressure will be approximately 5,000 psi in the case of a chamber rated for 15,000 charging and working pressure. The accumulators can be charged with external fluid at the wellsite by charger 60 as shown in FIG. 1 of the application. With the appropriate charger 60 they may also be pre-charged with gas at the well site. Alternatively, the accumulators can be charged offsite at a factory and transported to the wellsite when needed. Due to the small size of the accumulator, it is highly portable and affords great flexibility to oilfield operations.

Typically, for applications in fluid-filled boreholes penetrating subterranean formations, tube waves need to be delivered under relatively high pressure and carry relatively high energy compared with tube waves generated for other uses. This is because the fluid in the borehole is normally under high pressure from the subterranean formation and/or surface equipment such as pumps. Low-energy tube waves may not be able to propagate far enough before it is absorbed by the fluid in the borehole. Also, a low-energy tube wave may not be able to produce a sufficiently high signal-noise ratio for sensors to detect the reflected wave when accompanied by the noise produced during well servicing. Accordingly, in one embodiment of the current application, there is provided a method or system for generating tube waves with a pressure that is equal to or below about 1% of wellbore pressure or equal to below about 50 psi, which are primarily suitable for wellbores not under services, i.e. quiet wellbores. The pressure difference can be either positive or negative. In another embodiment, there is provided a method or system for generating tube waves with a pressure that is between about 2% to about 20% (inclusive) of wellbore pressure or between about 100 psi to 500 psi (inclusive). Again, the pressure difference can be either positive or negative. Tube waves in this range are particularly useful in wellbores under some services but without an extraordinary amount of noises. For wellbores having a substantial amount of background noises (such as wellbores under hydraulic fracturing treatment) or wellbores having changed dimensions and/or structures, tube waves with higher energy are needed. Accordingly, in a further embodiment, there is provided a method or system for generating tube waves with a pressure that is between −30% to −100% of wellbore pressure or +50% to +200% of wellbore pressure.

The valve 40 can be a plug valve (sometimes referred to as a hammer valve in the oilfield due to the end connections that are assembled using a hammer), a ball valve, or any other type of valves that are capable of opening/closing in a relatively fast speed. In some cases, the valve 40 is a rotary valve that operates on quarter turns, although other variations can be employed as well. In this patent application, when the terms "fast", "quick", and "rapid" are used in connection with the description of the valve 40, they generally mean that the valve 40 is capable of opening or closing the flow path of the medium in a time that is within an order of magnitude of the firing duration of the tube wave, illustrated in for example in FIG. 2A as time "t". In one embodiment, the valve 40 is capable of opening or closing the flow path of the medium in a time that is less than the firing duration of the tube wave. In another embodiment, the valve 40 is capable of opening or closing the flow path of the medium in a time that is between about 1-3 times (inclusive) the firing duration of the tube wave.

Figure 2A:
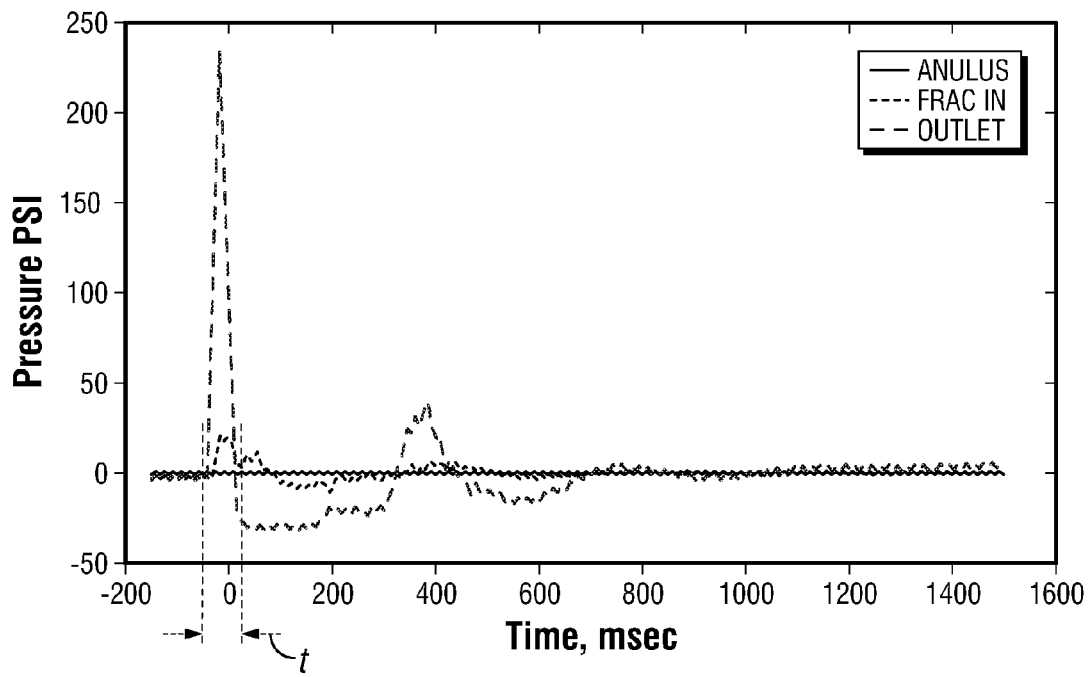
FIG. 2A is a diagram showing data recorded by using a tube wave generating system according to one embodiment of the current application.

In general, the fast operating valve of the current application is capable of opening or closing the flow path of the medium in less than or equal to approximately 500 milliseconds. In one exemplary embodiment as illustrated in FIG. 2A, the firing duration of the tube wave was approximately 50 milliseconds and the fast-operating valve 40 was capable of opening or closing the flow path of the medium in approximately 120 milliseconds. In other embodiments, the fast-operating valve 40 is capable of opening or closing the flow path of the medium in approximately 50 milliseconds, 75 milliseconds, 100 milliseconds, 150 milliseconds, 175 milliseconds, 200 milliseconds, 250 milliseconds, 300 milliseconds, 350 milliseconds, 400 milliseconds, 450 milliseconds, or 500 milliseconds.

The valve 40 can be pneumatically or hydraulically operated. An actuator (not shown) incorporating a spring (not shown) that acts during the opening or closing cycle of the valve 40 can be used to increase the opening or closing speed of the valve 40. Vane actuators may be selected over piston actuators for this application. In general, the higher the chamber pressure, the more torque is required to open the valve 40 due to the friction in the seals. However, an increased torque typically means slower opening/closing of the valve 40, hence increasing volumes of air or other medium that is passed through the valve 40. Therefore, an operator often needs to carefully balance the benefit of operating under higher chamber pressure (hence higher-energized tube waves) and the drawback associated with the increased torque (hence the slower opening/closing of the valve). A proper balance needs to be struck to achieve an overall satisfactory result.

Figure 2B:
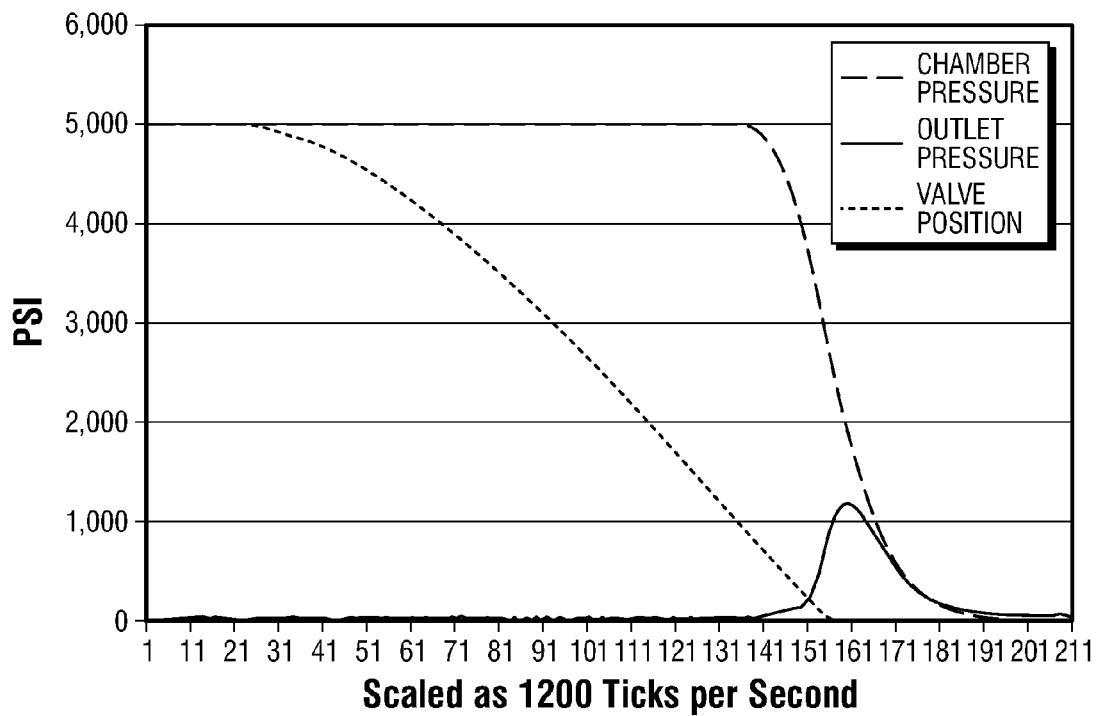
FIG. 2B is another diagram showing data recorded by using a tube wave generating system according to one embodiment of the current application.

In one specific embodiment of the application, a standard 2×1 size 1502 hammer valve such as the FMC's ULT 150 plug valve part number P516108 was used as the actuator. The specification of the valve can be found at FMC's online catalogue. A spring was used to assist the opening of the valve. This valve has a cylindrical plug with a round cross drill for the fluid passage that is 0.75" bore. The two ports tapered from the full bore of the end connections (1.75") down to match the bore of the plug. Two seal sections were disposed, one on each port such that pressure applied to one port pushes the plug into the opposite seal section, effecting a seal. Each seal section had a central hole matching the plug bore. When the plug was rotated such that the plug bore, the two seal section bores, and the two valve port bores are lined up, it was in the open position and provided a path with at least 0.75" inside diameter through the entire valve. When the plug is rotated 90 degrees this path was closed. When three accumulators were connected to a common wellsite manifold (not shown), an initial pressure of 15,000 psi was achieved upstream of the valve 40. The actuator was then activated to rapidly open the valve 40, producing a tube wave of approximately 230 psi. The result of one experiment is shown in FIG. 2A of the current application. The result of another experiment is shown in FIG. 2B of the current application where the valve was fired into an orifice rather than a well so the outlet pressure signature is simpler comparing to that in FIG. 2A because there were no reflections from the borehole.

In some other embodiments, the valve 40 can be one of the regenerative valves as discussed in more detail below. Generally speaking, a regenerative valve means a type of valve that opens with an increasing force once an initial stage of opening is assumed. In some cases, the regenerative valve has a moving element disposed therein, said moving element having a first area that is exposed to a first port and a second area that is exposed to a second port, where said first area is different from the second area so that the moving element is held in a closed position upon the second port until an external force is applied to push the moving element away from the second port. At that moment, an increasing force is exerted by one of the first pressure in the first port and the second pressure in the second port functions on one of the first area and the second area, therefore push the moving element to a fully opened state.

An example of a regenerative valve 140 is shown in FIG. 3, which comprises a control chamber 130, a treating chamber 120, and a poppet 103 disposed therein. A set of seals 107, 108 are provided between poppet 103 and the valve body 170, therefore preventing the control chamber 130 and the treating chamber 120 from being in fluid communication with each other. For clarity, the seal that is positioned close to the control chamber 130 side is called the control fluid seal 108; the seal that is positioned close to the treating chamber 120 side is called the treating fluid seal 107. Optionally, a port 155 can be provided between the control fluid seal 108 and the treating fluid seal 107 and used for purposes such as lubricating the friction between the poppet 103 and the valve body 170 and providing a path for leakage to leave the valve body 170 and be visible externally.

Within the control chamber 130, the poppet 103 further comprises a control piston 135 that extends substantially perpendicularly from the longitudinal axis "Y" of the poppet 103. A control piston seal 109 is provided between the control piston 135 and the side walls of the control chamber 130, therefore separating the control chamber 130 into two sub-chambers 131, 132 that are not in fluid communication with each other inside the control chamber 130. An upper port 151 is provided to open the upper sub-chamber 131 of the control chamber to the control fluid. A lower port 152 is provided to open the lower sub-chamber 132 of the control chamber 130 to the control fluid. A cushion 160 can be provided at the top wall of the control chamber 130 to reduce the mechanical impact of the poppet 103 on the valve 140 by providing an orifice that slows the end of the poppet's motion in a gradual fashion rather than by an abrupt impact.

Within the treating chamber 120, the poppet 103 similarly comprises a treating seat 137 that extends substantially perpendicularly from the longitudinal axis "Y" of the poppet 103. Unlike the control piston 135 in the control chamber 130, the treating seat 137 in the treating chamber 120 does not extend all the way to the side walls of the treating chamber 120. Instead, the peripheral wall of treating seat 137 may be fully surrounded by the treating fluid during operation and the treating seat 137 does not divide the treating chamber 120 into multiple sub-chambers.

As used in this patent application, terms such as "up", "down", "upper", "lower", "top" and "bottom" and other like terms indicate relative positions of the various embodiments of the system and apparatus of the present application which is vertically oriented as shown in the drawings. However, it should be borne in mind that the system and apparatus of the present application can be oriented vertically, highly deviated from the vertical, or horizontally. Depending on the circumstances, such terms may refer to a left to right, right to left, or other relationship as appropriate.

In one embodiment, the lower portion of the treating seat 137 tapers downwardly and inwardly, generally indicated as 113 in FIG. 3 of the application. Therefore, the horizontally cross-sectional area of the treating seat 137 is reduced from a larger top surface area to a smaller bottom surface area. A complimentary but steeper profile can be provided at the bottom wall of the treating chamber 120 where a downstream port 110 is connected to the treating chamber 120. Therefore, when the poppet 103 moves downwardly towards the downstream port 110, a tight seal can be formed between the treating seat 137 and the bottom wall of the treating chamber 120 where the downstream port 110 joins.

The treating chamber 120 is further connected to an upstream port 115. During operation, a treating fluid can be introduced into the treating chamber 120 via the upstream port 115 and, when treating seat 137 is not engaged with the bottom wall of the treating chamber 120, the treating fluid flows through the treating chamber 120 and discharges through the downstream port 110.

For the ease of reference, as used in the current application, the cross-sectional area of the portion of the poppet that engages and seals the downstream port 110 is called the "seat area" of the poppet, and the cross-sectional area of the main body of the poppet is called the "stem area" of the poppet. Therefore, in the embodiment shown in FIG. 3, the seat area (A2) of poppet 103 is larger than the stem area (A1) of poppet 103. This feature leads to a rapid, regenerative opening of poppet 103.

Starting with the situation when the poppet 103 is in an opened condition, the upstream port 115 is in fluid communication with the treating chamber 120 which in turn is in fluid communication with the downstream port 110, i.e. P1=P2. To close the valve 140, the poppet 103 needs to be moved downwardly to engage the downstream port 110. This can be achieved by introducing the control fluid into the upper sub-chamber 131 of the control chamber 130 via the upper port 151. The control fluid needs to be supplied at a pressure such that pressure times the area of the control piston 135 is larger than the P2 pressure times the area of the poppet stem at seal 170. The increased pressure in the upper sub-chamber 131 pushes down the control piston 135, which in turn brings down the poppet 103.

After the poppet 103 engages with and seals off the downstream port 110, the pressure in the treating chamber 120 is increased by introducing high-pressured treating fluid via the upstream port 115. The increased pressure in the treating chamber 120 acts to push the poppet 103 down. Eventually, the pressure in the treating chamber 120 is sufficiently high that it is no longer necessary to maintain a positive pressure in the upper sub-chamber 131 of the control chamber 130 because the pressure P2 times the annular area between A1 and A2 exceeds the force due to the pressure P1 times the area A2. At this point, the positive pressure in the upper sub-chamber 131 can be completely removed. In some cases, even a negative pressure can be introduced into the upper sub-chamber 131, which may further facilitate the rapid opening of the valve 140 when it is time for the valve to open. It may also be advantageous to have A1 and A2 disposed such that some pressure is always required in the upper sub-chamber 131 to keep the valve closed.

To open the valve 140, a positive pressure can be introduced into the lower sub-chamber 132 of the control chamber 130. Alternatively, a negative pressure can be introduced into the upper sub-chamber 131. At a certain point, an equilibrium is achieved when the downward force exerted by the pressure P2 in the treating chamber 120 on the upper surface of the treating seat 137 is exactly the same as the sum of the upward force exerted by the borehole pressure P1 on the lower surface of the treating seat 137 plus the upward force exerted by the positive pressure in the lower sub-chamber 132 (or the negative pressure in the upper sub-chamber 131) of the control chamber 130 on the treating seat 135 of the poppet 103.

Thereafter, a slight increase in the positive pressure in the lower sub-chamber 132 (or a slight increase in the negative pressure in the upper sub-chamber 131) of the control chamber 130 will break the equilibrium and the poppet 103 will begin to move upwards to open the valve 140. With the treating seat 137 departing slightly from the corresponding structure at the bottom wall of the treating chamber 120 where the downstream port 110 is connected, a small annulus is formed between the tapered portion of the treating seat 137 and the bottom wall of the treating chamber 120. Accordingly, the treating chamber 120 starts to become in fluid communication with the downstream port 110. The pressure P1 in the downstream port 110 starts to rise and the pressure P2 in the treating chamber 120 starts to decrease. Moreover, with the appearance of the small annulus, the entire seat area (shown as A2 in FIG. 3) becomes subject to the increasing pressure P1. As a result, the upward force exerted by the increasing pressure P1 on the seat area A2 of the treating seat 137 grows rapidly, exceeding the downward force exerted by the decreasing pressure P2 on the upper surface of the treating seat 137. The net result is a regenerative, upwardly oriented, force that rapidly pushes the poppet 103 to a fully opened position.

The control fluid can be any medium that is capable of being injected into a cavity and exerting forces therein, such as air, nitrogen, alcohol, diethyl ether, water, silicone, hydrocarbon oil, their mixtures, etc. Similarly, the treating fluid can be any medium that is capable of being injected into a cavity and exerting forces therein, such as air, nitrogen, alcohol, diethyl ether, water, silicone, hydrocarbon oil, their mixtures, etc.

FIG. 4 shows an improved embodiment of FIG. 3, where an improved regenerative valve 240 is provided. The improved regenerative valve 240 does not contain a control piston 135 that extends all the way to the side walls of the control chamber 130, as in FIG. 3. Instead, a disc 235 is provided between the poppet 203 and the side walls of the control chamber 230, which divides the control chamber 230 into an upper sub-chamber 231 and a lower sub-chamber 232. A set of seals 209, 209' are provided at the side walls of the disc 235 to ensure that the upper sub-chamber 231 and the lower sub-chamber 232 are not in fluid communication with each other in the control chamber 230. In one embodiment, the stem of the poppet 203 is narrowed at the region where the disc 235 is provided. Therefore, a shoulder 237 can be formed on the stem of the poppet 203 so that when disk 235 moves downwardly, the disc 235 can make contact with the shoulder 237 and push down the poppet 203. Similarly, a stopper 236 can be provided at the top of the poppet 203 so that when disk 235 moves upwardly, the disc 235 can make contact with the stopper 236 and push up the poppet 203. In this embodiment, the weight of the poppet 203 that needs to be moved upwardly or downwardly during an opening or closing motion of the valve is reduced, because the disc 235 does not form a portion of the poppet 203. Accordingly, a faster opening or closing of the valve can be achieved.

In one embodiment, the upper port 251 is connected to a space 260, which in turn is connected to the upper sub-chamber 231 of the control chamber 230. The control fluid contained in space 260 can function as a shock absorption mechanism for the upwardly moving poppet 203. This can be advantageous because a separate cushion (such as cushion 160 in FIG. 3) can be eliminated.

FIG. 5 shows another improved embodiment of FIG. 3. There, a pressure balanced regenerative valve 340 is provided. In this embodiment, poppet 303 contains a passage way 304 for fluids in the downstream port 310 to travel upwardly towards a buffering chamber 360 that is located on top of the control chamber 330, as shown by arrows in FIG. 5. The passage way has a first orifice 302 that opens to the downstream port 310 and a second orifice 302' that opens to the buffering chamber 360. Therefore, the buffering chamber 360 is in fluid communication with the downstream port 310, and the pressure in the buffering chamber 360 is the same as the pressure in the downstream port 310, i.e. P1. Hence, the valve 340 in the current embodiment is called a "balanced pressure" valve. Because one of the treating pressures is balanced by being applied to both sides of the poppet 303, a much smaller actuator can be used to operate the valve. A faster actuation may also be achieved.

The buffering chamber 360 is separated from the control chamber 330 by a set of seals 311, 312 and a port 313 disposed therebetween. Therefore, the buffering chamber 360 is not in fluid communication with the control chamber 330. Likewise, the control chamber 330 is separate from the treating chamber 320 by a set of seals 307, 308 and a port 305 disposed therebetween. Therefore, the control chamber 330 and the treating chamber 320 are not in fluid communication with each other. Optionally, a bearing 314 can be provided to facilitate the alignment of the poppet 303 in the middle of the valve 340, and to reduce the impact of the pressure pulse on the seals, such as seal 307 by providing a throttling orifice. Also optionally, the treating chamber 320 can be equipped with more than one port 315, 315' to improve the characteristics of the valve and reduce the side loads on the poppet 303.

In this embodiment, the stem area may be selected independently depending on the purpose one intends to achieve. If the seat area is larger than the stem area, the poppet 303 will latch closed when the pressure in the treating chamber 320 is higher than the pressure in the downstream port, i.e. (P2>P1). Conversely, if the seat area is smaller than the stem area, the poppet 303 will latch closed when the pressure in the treating chamber 320 is lower than the pressure in the downstream port, i.e. (P1>P2). In one embodiment, the seat area is approximately zero.

To reduce the mechanical impact caused by rapidly opening the poppet 303 on the body of the valve 340, a space 337 can be created in the upper sub-chamber 331 of the control chamber 330, which as in FIG. 3, is separated from the lower sub-chamber 332 of the control chamber by a seal 309 disposed on the side wall of a control piston 335. An upper port 351 is in fluid communication with the space 337, which in turn is in fluid communication with the upper sub-chamber 331 of the control chamber 330. A lower port 352 is in fluid communication with the lower sub-chamber 332 of the control chamber 330. Space 337 is configured to closely fit a shoulder 336 formed at the corner of the poppet 303 and the control piston 335. Therefore, when poppet 303 moves upwardly, the shoulder 336 engages with the space 337 creating an annular orifice. The control fluid in the space 337 is compressed to produce a resistant force against the movement of the poppet 303. Therefore, the impact of the poppet 303 on the valve 340 is reduced. In one embodiment, the shoulder 336 may be made as a separate ring with some clearance on the poppet stem such that it can self align with space 337 and reduce the requirement for precision machining of these parts.

FIG. 6 illustrates several different types of sealing mechanisms that may be applicable to the embodiments of the current application. They are provided as examples, not limitations, to the current application. Other variations are possible and should be considered within the scope of the current application. In general, sealing mechanisms in the current application are susceptible to wear and tear due to the high pressure in the chambers, fast motion of the poppet, and/or the pulsation of the fluids. In some cases, positive seal retaining mechanisms are employed; in some other cases, bonded seals are used. In some cases, high yield stress plastic (such as PEEK) or other elastic materials are used in the seal; in some other cases, metal to meal seal is employed. In some cases, one or more components of the sealing mechanism are modular so that they can be dissembled and replaced after wear and tear.

Referring now to FIG. 6, various different types of sealing mechanisms are depicted in the context of sealing the poppet 403 and the downstream port 410, although it should be noted that such sealing mechanisms may be applicable to other locations of the valves as well. In FIG. 6A, a retaining space 412 is provided on the poppet 403 to accommodate the seal 411, so as to prevent seal 411 from being extruded or dislocated from its original position due to pulsations of the fluids, frictions from the wall 414 of the downstream port 410, etc. Alternatively, in FIG. 6C, the seal 431 and the retaining space 432 can be provided in the inner surface of wall 414 of the downstream port 410.

To reduce the frictional force caused by the inner surface of the wall 414 of the downstream port 410, in FIG. 6B, the seal 421 and the retaining space 422 can be provided at the bottom surface of the poppet 403. Therefore, the seal is created between the bottom surface of the poppet 403 and the top surface of the wall 414 of the downstream port 410. In all of these sealing systems the flexible sealing member may be advantageously bonded to the either the poppet 403 or to a replaceable part attached to the poppet.

In FIG. 6D, a replaceable component 443 is provided between the poppet 403 and the wall 414 of the downstream port 410. In the illustrated embodiment, the displaceable component 443 is in the shape of a circular disc; however, other shapes can be applicable as well. Also, in the illustrated embodiment, the disc 443 is disposed upon a shoulder 416 created around the opening of the downstream port 410. A seal 441 within a retaining space 442 can be optionally included between the disc and the wall 414. A retaining ring 444 can be employed to keep the disc 443 in place. In the illustrated embodiment, the retaining ring 444 is lodged inside a retaining space 445 located in the vertical surface of the shoulder 416 at a location that is above the seal 441. Protrusion 446 helps steer the high speed flow from a radial direction to an axial direction.

FIG. 6E shows an improved version of FIG. 6D. There, two shoulders 416, 417 are created in the wall 414 of the downstream port 410. The first shoulder 416 accommodates the replaceable disc 453. A seal 451 is provided within a retaining space 452, both located in the vertical surface of the first shoulder 416. Alternatively, the seal may be located on the replaceable disc 453. The second shoulder 417 is wider and higher comparing to the first shoulder 416, and it accommodates the stopper 454. Unlike the stopper 444 in FIG. 6D which is lodged inside a retaining space 445, in FIG. 6E, the stopper 454 is lodged in position by threads. That is, the outer surface of the stopper 454 comprises a series of threads which can engage with a series of complimentary threads located on the vertical wall of the second shoulder 417. Optionally, a slanted surface 458 is created between the poppet 403 and the replaceable disc 453 to improve the overall seal of the assembly. Further, the angle of the poppet nose may sometimes be slightly steeper than the angle of the replaceable seat 453 in order to produce a line contact where the two come together. In this case, one or both of the elements may be expected to deform slightly to produce a contact strip such that the contact pressure is equal to the yield stress of the softer of the two materials.

FIG. 6F shows a further improved version of the seal mechanism that can be used in the current application. Here, a replaceable component 463 is provided as a portion of the poppet 403 instead of the downstream port 410. Specifically, in the illustrated embodiment, a tip 466 is created at the bottom of the poppet 403. A replaceable disc 463 can be slid or screwed on the tip 466 and retained by a stopper 464. In the illustrated embodiment, the stopper engages the tip 466 by threads, although other means of engagement can be utilized as well. Optionally, a seal 461 located within a retaining space 462 can be provided between the tip and the replaceable disc 463. In one embodiment, a slanted surface 468 is created between the replaceable disc 463 and the wall 414 of the downstream port 410 to improve the overall seal of the assembly. In all of these sealing systems it may be advantageous to minimize the width of the sealing contact between the poppet and the seat to ensure that the sealing area of the poppet is close to the intended area, facilitating the desired regenerative action of the valve.

FIG. 7 shows a regenerative diaphragm valve 540. The left portion of FIG. 7 illustrates the cross-sectional view of the valve 540 in the closed state; the right portion of FIG. 7 illustrates the cross-sectional view of the valve 540 in the open state. Specifically, in the depicted embodiment, a diaphragm 550 is provided between a control chamber 530 and a treating chamber 520. The control chamber 530 is equipped with a control port 507; the treating chamber 520 is equipped with a port 515. In the illustrated embodiment the diaphragm 550 is connected by a screw 551 to the body of the chambers on one side, and by a disc 555 and a stopper 558 to a poppet 503 on another side. A seal 552 within a retaining space 553 can be optionally provided between the disc 555 and the diaphragm 550. While the drawing shows a relatively thick elastomer diaphragm, a metal diaphragm (typically corrugated) is also suitable for this service.

In the illustrated embodiment, poppet 503 has a cross-sectional profile that is substantially in the shape of a reversed "T". The large base provides a large seat area that can engage and seal the downstream port 510, which is optionally equipped with a port 509; the slender stem comprises threads on the outer surface which can engage the stopper 558 and/or the retaining disc 555 of the diaphragm 550. Optionally, an orifice is provided through the center of the poppet 503, which enables the control chamber 503 to be in fluid communication with the treating chamber 520, albeit with substantial restrictions.

In operation, the valve 540 can be regeneratively opened to produce fast onset of tube waves. Starting from the condition when the poppet 503 is in the open state, i.e. right half of FIG. 7, the treating chamber 520 is in fluid communication with the downstream port 510. The control port 507 is then opened to allow fluids being pumped into the control chamber 530. When the pressure in the control chamber 530 is sufficiently high, the diaphragm 550 and the poppet 503 are pushed down to engage with and seal off the downstream port 510. Once a seal is achieved, the pressure in the treating chamber 520 raises, partially or completely due to fluids passed through the orifice 506 in the poppet 503. To fire the valve 540, control port 507 can be opened either to the atmosphere or to the port 509 of the downstream port 510. When the pressure in the control chamber 530 falls enough to pull the poppet 503 off its seat, the valve 540 regeneratively opens.

A pressure relief valve (not shown) to limit the maximum differential pressure across the diaphragm 550 can be optionally included, especially for use in high pressure services, which would further expedite the opening of the valve. Moreover, a gas chamber (not shown) can be optionally connected to the control chamber 530, which would further expedite the opening of the valve by providing the ability to compress the contents of the control chamber 530 during opening.

Figure 8:
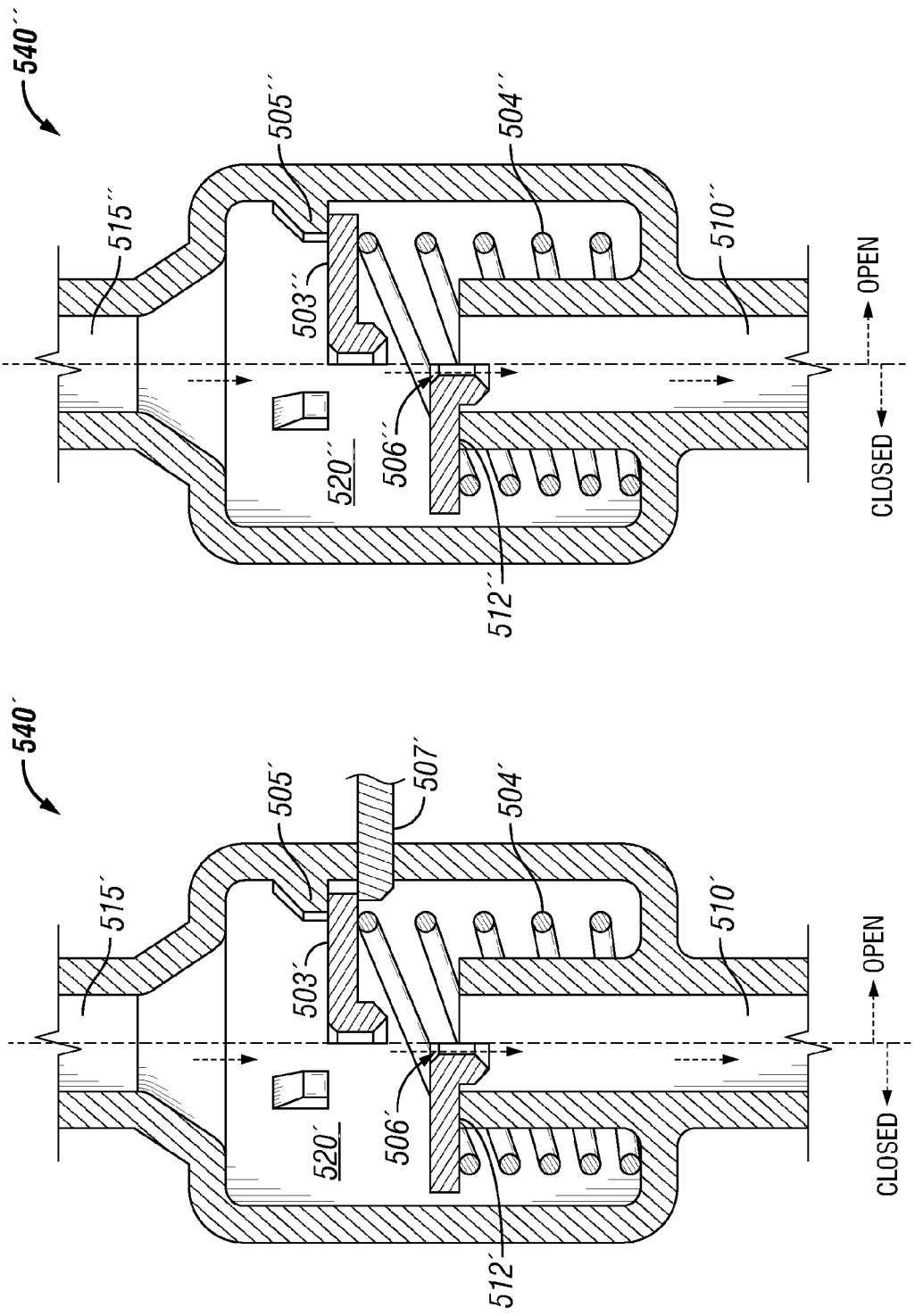
FIGS. 8A-8C are cross-sectional views of various pop-safety relief valves according to embodiments of the current application.

Pop-safety relief type valves can also be used to produce tube waves. An example is shown in FIG. 8A. The valve 540 comprises an upstream port 515, a downstream port 510, and a poppet chamber 520 formed between the two ports. A poppet 503 is disposed inside the poppet chamber 520. The poppet is connected to a spring 504 on one side, which in turn rests upon a seat 512 that is formed where the downstream port 510 connects to the chamber 520. The spring 504 exerts forces on the poppet 503, pushing the poppet 503 towards the upstream port 510.

Starting with the "closed" condition as shown in the left half of FIG. 8A, the poppet 503 rests upon a seat 512 formed around the opening of the upstream port 515 to the poppet chamber 520 and seals the upstream port 515 from the poppet chamber 520. Thereafter, the pressure in the upstream port 515 is increased and/or the pressure in the poppet chamber 520 is decreased. When the pressure difference between the upstream port 510 and the poppet chamber 520 is sufficiently high to overcome the downward force exerted by the spring 504, the poppet 503 is started to be lifted off the seat 512. When this happens, more area of the poppet 503 is exposed to the high pressure coming from the upstream port 510 due to its close proximity to the walls of the poppet chamber 520, which further compresses the spring 504. The regenerative force rapidly pushes the poppet 503 to an "open" position, as shown in the right half of FIG. 8A.

Optionally, a stopper 505 is provided inside the poppet chamber 520 to restrict the motion of the poppet 503 and avoid fully compressing the spring 504. In the illustrated embodiment, the stopper 505 is in the form of one or more extrusions located on the inner wall of the poppet chamber 520. However, other forms of stoppers can be used as well. With the stopper 505 in place, the valve 540 can produce positive pulses followed by sudden steps at the downstream port 510 and negative pulses followed by sudden steps at the upstream port 515. The sudden impact of the poppet on the stops will tend to form a tube wave with a doublet character in the event that the stored energy is exhausted in a time comparable to the transit time of the poppet 503 between the seat 512 and the stopper 505. If the stored energy is expended in a time significantly longer than this transit time, port 510 will generally experience a positive tube wave.

FIG. 8B shows a variation to the embodiment in FIG. 8A that acts on a flowing fluid stream rather than opening a connection between two areas of differing pressures. There, valve 540' comprises an upstream port 515', a downstream port 510', and a poppet chamber 520' formed between the two ports. A poppet 503' is disposed inside the poppet chamber 520'. The poppet is connected to a spring 504' on one side, which in turn rests upon an opening where the downstream port 510' connects to the poppet chamber 520'. The spring 504' exerts forces on the poppet 503', pushing the poppet 503' away from the downstream port 510'.

Starting with the "open" condition as shown in the right half of FIG. 8B, the poppet 503' is held in position between one or more stoppers 505' formed on the inner surface of the poppet chamber 520' and a trigger 507' that transverse the wall of the poppet chamber 520'. The fluid flows from the upstream port 515', into the poppet chamber 520', through an orifice 506' formed in the center of the poppet 503' and around the outside of poppet 503' towards the downstream port 510', shown by arrows in FIG. 8B. Due to the small size of the orifice 506', the fluid flows with significant restrictions across the orifice 506'. A pressure drop is created between the poppet chamber 520' and the downstream port 510'.

When it is time to fire the valve, the trigger 507' is pulled to release the poppet 503'. The force of the spring 504' is overcome by the pressure drop between the two sides of the poppet 503' and the poppet 503' is quickly pushed towards the downstream port 510'. The poppet 503' finally comes into contact with a seat 512' formed around the opening of the downstream port 510' to the poppet chamber 520' and seals the downstream port 510' from the poppet chamber 520', producing a negative tube wave in the downstream port 510' and a positive tube wave in the upstream port 515'. The orifice 506' still allows a small quantity of fluids to pass from the poppet chamber 520' to the downstream port 510', however the flow path is significantly restricted due to the small size of the orifice 506'.

FIG. 8C shows a further variation to the embodiments in FIGS. 8A and 8B. There, the trigger 507' is removed. The valve 540" operates essentially on the fluids flowing from the upstream port 515" to the downstream port 510". Starting from left half of FIG. 8C where the valve 540" is in a closed position, the fluid flows from the upstream port 515', into the poppet chamber 520', through an 506' formed in the center of the poppet 503' towards the downstream port 510', shown by arrows in FIG. 8C. Due to the small size of the orifice 506", the fluid flows with significant restrictions across the orifice 506" in addition to the restriction between the outside diameter of the poppet 503" and the housing 520". A pressure drop is created between the poppet chamber 520" and the downstream port 510". At a certain point, the pressure drop is sufficiently high so that the downward force caused by the pressure difference exceeds the upward force caused by the spring 504". As the poppet 503" approaches the seat 512", the pressure drop across the poppet rapidly increases, causing the poppet to be driven toward the seat faster. The poppet 503" is pushed down to rest upon the seat 512" of the downstream port 510" abruptly. At this time the flow speed at the upstream port 515" is suddenly reduced or stopped, generating a negative pulse in the downstream port 510" and a positive pulse in the upstream port 515". One or more stoppers 505" can be provided on the inner surface of the poppet chamber 520" to provide sudden stops to the poppet 503" and produce a more repeatable switching behavior with flow.

FIG. 9 shows a flow actuated tube wave valve 640. A conduit 670 comprises a downstream port 610, an upstream port 615, and a swing check 603 disposed between the two ports. The swing check 603 is pivotally connected to the inner wall of the conduit 670 around a point 604 which is located about the juncture of the downstream port 610 and the upstream port 615. The swing check 603 can pivot between an "open" position where the swing check 603 is substantially parallel to the longitudinal axis of the conduit 670, as shown in the right half of FIG. 9, and a "closed" position where the swing check 603 rests upon a seat 612 formed on an opposite inner wall of the conduit 670 so that the swing check 603 can be substantially perpendicular to the longitudinal axis of the conduit 670 when it is in the closed position, as shown in the left half of FIG. 9.

In operation, the swing check 603 is first held at the open position by an actuator (not shown) to allow the downstream port 610 to be in fluid communication with the upstream port 615. The actuator is then released. The fluid flow will carry the swing check 603 downwardly into the closed position. This produces a negative pulse at the downstream port 610 and a positive step change at the upstream port 615. The swing check 603 can then be restored to its open position either by mechanical means or by reversing the fluid flow path in the conduit 670.

FIG. 10 discloses one type of hammer source that can also be used to produce tube waves. In this system, i.e. hammer source 700, kinetic energy from weight 760 driven by actuator 770 is transferred to plunger 703 by impact, which in turn produces tube waves in port 710. Specifically, in the illustrated embodiment, a plunger 703 is provided across a top wall 711 of the port 710. A seal 707 is provided between the plunger 703 and the top wall 711 to prevent the port 710 from being in fluid communication from the outside. A bearing 714 can be optionally included to improve the stability of the plunger 703 in the top wall 711 and to reduce pressure pulsations seen by seal 707. A spring 704 is provided to push the plunger in a resting position where the bottom of the plunger is substantially adjacent to the top wall 711 of the port 710. Optionally, a vented washer 705 is provided between the bottom of the plunger 703 and the top wall 711 to eliminate the suction created by the bottom of the plunger 703 on the top wall 711 when the plunger 703 moves during firing.

In operation, the actuator 770 causes the weight 760 to move rapidly towards the top of the plunger 703. Upon impact, the kinetic energy from the weight 760 is transferred to the plunger 703, causing the plunger 703 to move downwardly inside the port 710. The bottom of the plunger 703 pushes the fluids inside the port 710 and generates a positive pulse at the port 710. This is the firing position of the plunger 703. Thereafter, the weight 760 is pulled back by the actuator 770 and the spring 704 (as well as the pressure in the port 710) pushes the plunger back to its resting position. The plunger 703 is now ready for firing again.

It should be noted that although in the illustrated embodiment in FIG. 10 the spring 704 is provided outside the port 710, it can also be provided inside the port 710, for example, at a location currently occupied by the vented washer 705. In such a case, the spring will exert a downward force on the plunger 703, which is in turn balanced by the upward force exerted by the pressure in the port 710. Therefore, with a suitable strong spring, when the plunger 703 is at the resting station, there is zero or a minimal amount of upward forces on the plunger. A relatively smaller amount of impact by the weight 760 can produce an effective dislocation of the plunger 703.

Figure 11:
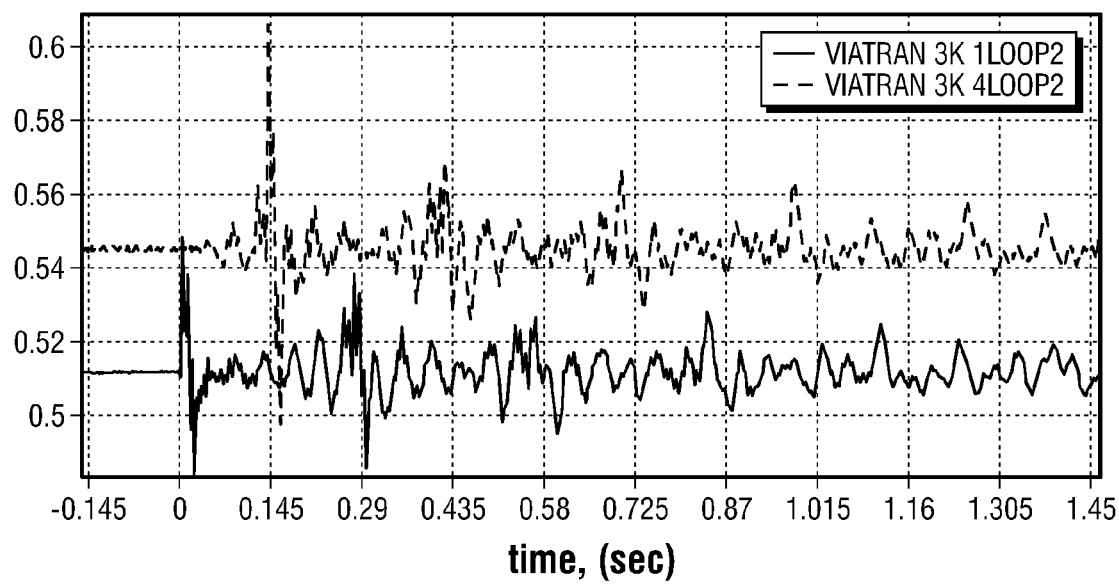
FIG. 11 is a diagram showing data recorded by using a hammer source according to one embodiment of the current application.

FIG. 11 shows a pulse generated by a hammer source comprising an approximately 60 psi tube wave on top of an approximately 540 psi baseline pressure.

Figure 12:
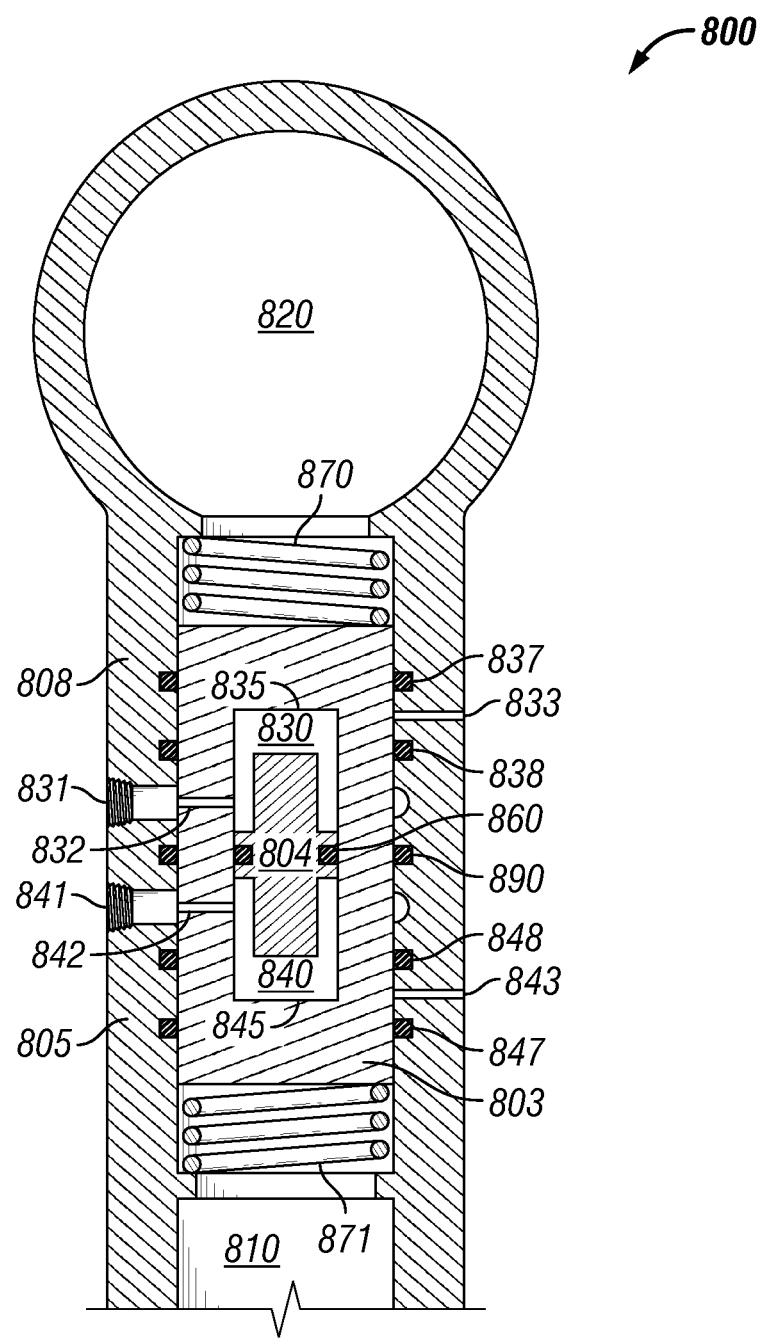
FIG. 12 is a cross-sectional view of another hammer source according to one embodiment of the current application.

FIG. 12 discloses a hammer source that is pressure balanced. The hammer source 800 comprises a tubular housing 805 that is connected to a cavity 820 on one end and to a port 810 on the other end. In one embodiment, the pressure in cavity 820 is equalized with the pressure in the port 810. In one embodiment, the cavity 820 is made of elastic materials and/or contains a low bulk modulus fill fluid such as ethyl alcohol, diethyl ether, silicone oil, or similar.

A flyer 803 is provided within the housing 805, between the cavity 820 and the port 810. A set of springs 870, 871 are provided to keep the flyer 803 generally centered within the housing 805. In the illustrated embodiment, the flyer 803 is substantially hollow in the center of its body, where a piston 804 is located. In the illustrated embodiment, the piston 804 is substantially in the shape of a cylindrical rod, although other shapes can be used as well. Approximately around the middle of the longitudinal axis of the piston 804, a circular extension is formed that divides the hollow space inside the flyer 803 into an upper chamber 830 and a lower chamber 840. A seal 860 is provided between the circular extension and the inner surface of the hollow space inside the flyer 803 to ensure that the upper chamber 830 is not in fluid communication with the lower chamber 840.

An upper flyer port 832 is formed on the side wall of the flyer 803 to connect the upper chamber 830 to the small space located between the housing 805 and the flyer 803. An upper housing port 831 is formed on the side wall of the housing 805 to connect the small space located between the housing 805 and the flyer 803 to the outside of the housing 805. Accordingly, the upper chamber 830 of the flyer 803 is in fluid communication with the outside of the housing 805 via the upper flyer port 832, the small space located between the housing 805 and the flyer 803, and then the upper housing port 831.

Similarly, a lower flyer port 842 is formed on the side wall of the flyer 803 to connect the lower chamber 840 to the small space located between the housing 805 and the flyer 803. A lower housing port 841 is formed on the side wall of the housing 805 to connect the small space located between the housing 805 and the flyer 803 to the outside of the housing 805. Accordingly, the lower chamber 840 of the flyer 803 is in fluid communication with the outside of the housing 805 via the lower flyer port 832, the small space located between the housing 805 and the flyer 803, and then the lower housing port 831.

A seal 890 is provided between the inner surface of the housing 805 and the outer surface of the flyer 803, at a longitudinal location that is between (1) the upper flyer port 832/the upper housing port 831, and (2) the lower flyer port 842/the lower housing port 841. Therefore, the flow path to the upper chamber 830 of the flyer 803 is completely separated from the flow path to the lower chamber 840 of the flyer 803.

A set of upper seals 837, 838 is provided between the inner surface of the housing 805 and the outer surface of the flyer 803, at a longitudinal location that is above the upper housing port 831 to ensure that the fluid injected from the upper housing port 831 flows towards the upper flyer port 832 and enters the upper chamber 830, instead of leaking off to towards the cavity 820. An orifice 833 can be optionally included between the upper seals 837, 838 for lubricating purposes and the like.

Similarly, a set of lower seals 847, 848 is provided between the inner surface of the housing 805 and the outer surface of the flyer 803, at a longitudinal location that is below the lower housing port 831 to ensure that the fluid injected from the lower housing port 831 flows towards the lower flyer port 832 and enters the lower chamber 830, instead of leaking off to towards the port 810. An orifice 843 can be optionally included between the lower seals 847, 848 for lubricating purposes and the like.

In operation, the piston 804 can be moved up and down within the hollow space of the flyer 803 by injecting or depleting fluids in the upper chamber 830 or the lower chamber 840 of the flyer 803. The moving piston then impacts the upper inner surface 835 or the lower inner surface 845 of the flyer 803, causing the flyer 803 to move up and down to generate tube waves at the port 810. Motions of the flyer 803 that do not result in impacts can also generate tube waves if they are rapid enough.

FIG. 13 discloses a method of generating tube waves by pumping objects through an orifice. In the embodiment illustrated, an orifice 940 is provided on an inner surface of a tube 905. A ball 903 is introduced into the upstream port 920 of the tube 905 towards the orifice 940, as shown in FIG. 13A. At this moment, the upstream port 920 is in fluid communication with the downstream port 910, although with some restrictions caused by the orifice 940. Thereafter, the ball 903 reaches the orifice 940 and obstructs the flow path of the fluid from the upstream port 920 to the downstream port 910, as depicted in FIG. 13B.

Figure 14:
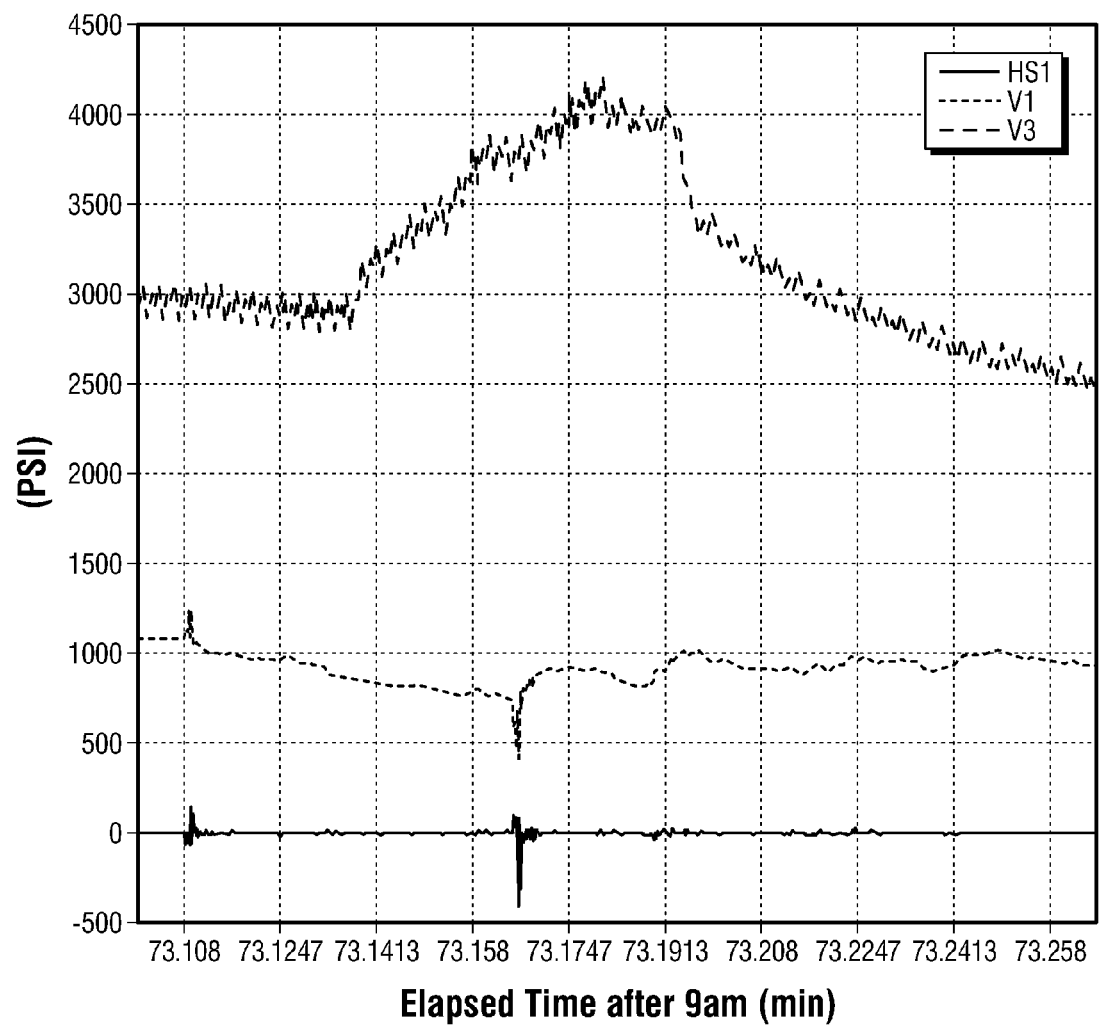
FIG. 14 is a diagram showing data recorded by using a system involving pumping objects through an orifice to generate tube waves according to one embodiment of the current application.

The pressure in the upstream port 920 then increases, forcing the ball 903 to deform and partially pass through the orifice 940, as shown in FIG. 13C. Then, with a slightly further increase of the pressure in the upstream port 920, the ball 903 is popped free into the downstream port 910, creating a positive tube wave at the downstream port 910, as illustrated in FIG. 13D. An exemplary pulse was recorded and shown in FIG. 14, where a tube wave of approximately 1000 psi was generated on top of a 3000 psi baseline at the end of 12,000 feet of tubing. The bottom two traces show the tube wave generated while the top trace shows pumping pressure. The first spike on the bottom two traces indicated the ball landing in the orifice. The second spike in the bottom two traces indicated the ball popping through the orifice. In FIG. 14, HS1 indicated a piezoelectric high speed pressure transducer that only responds to changing pressures; it does not measure continuous pressure. HS1 was illustrated as the bottom trace that was always close to zero. HS1 was located at the outlet of the well, as was the conventional pressure transducer V1 (middle trace). Conventional pressure transducer V3 (top trace) was located at the inlet to the coiled tubing reel; it observed pump strokes and was around 11,774 feet from the orifice. The first small peak in HS1 and V1 indicated the ball landing in the orifice. When the wave front from the flow stopping reaches the inlet to the coiled tubing, the pressure started to rise (the big hump). The next sharp negative spikes on the bottom two traces were the ball popping through. It took a while for the other end of the coiled tubing to observe the release of pressure.

It should be noted that the orifice may be located at the surface, downhole, or both. Multiple orifices may be used in parallel to allow higher flows before landing balls. Although ball shaped objects are illustrated in FIG. 13, objects of other shapes may be used as well. Moreover, crushable and/or hollow objects may be used to increase the pulse generated and/or avoid leaving objects in the well. In one embodiment, degradable balls such as the collagen "bioballs" used as sealers in fracturing operations are used, and the balls are fed into the tube by a traditional fracturing ball dropper. The tube wave creation can be conducted at the surface, at the end of a coiled tubing, or at the end of a drill pipe. Other variations are also possible and should be considered within the scope of the current application.

Figure 15:
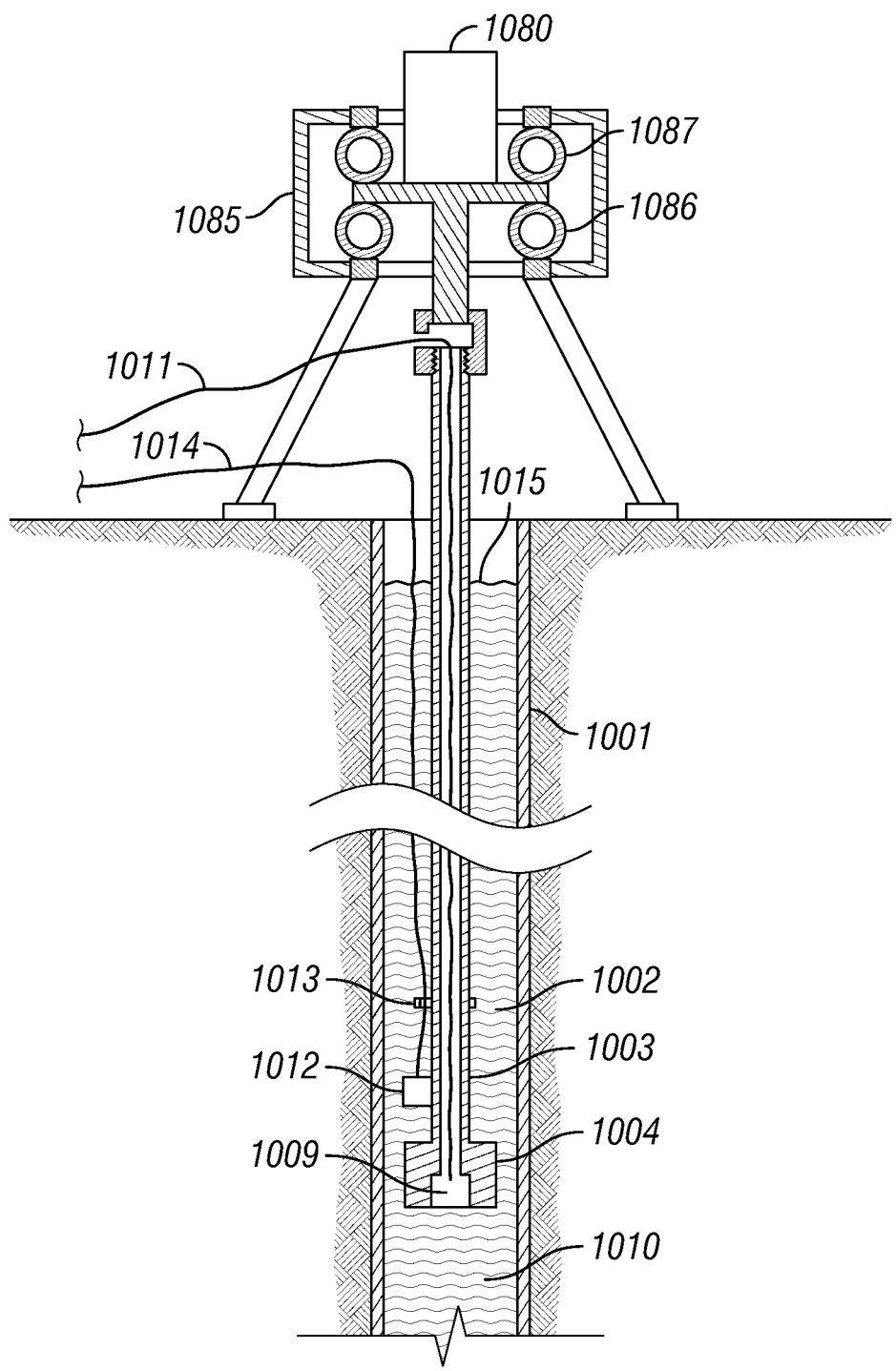
FIG. 15 is a cross-sectional view of a stinger system according to one embodiment of the current application.

FIG. 15 discloses a stinger 1003 that is specially suited for providing tube waves when a free surface 1015 is available. In the illustrated embodiment, the stinger 1003 comprises a string of tubes (such as PVC pipes) that is connected to a piece of surface equipment (such as an actuator) on one end and hangs freely inside a wellbore on the other end. In the illustrated embodiment, an actuator 1080 is configured to move the stinger 1003 up and down, and the stinger end 1004 has an enlarged cross-sectional area compared to the remaining portion of the stinger 1003. Therefore, when the stinger 1003 moves up and down in a wellbore 1001 containing fluids 1002, tube waves can be produced in the wellbore 1001. Producing tube waves near free surfaces is particularly difficult because of the limit on negative pressure set by the hydrostatic pressure between the free surface and the tube wave generator. In general, the deeper the tube wave generator can be placed, the larger the amplitude of wave that can be produced.

Optionally, a first pressure transducer 1009 is provided at the stinger end 1004, is connected to the surface by a first cable 1011 located inside the hollow center of the stinger 1003. Also, a second pressure transducer 1012 can be optionally provided at the external surface of the stinger, towards the distal end of the stinger 1003 but upstream from the stinger end 1004. The second pressure transducer 1012 is connected to the surface by a second cable 1014, which may be fastened to the stinger 1003 by clamps 1013.

Suspension systems 1086, 1087 can be optionally included to provide compliance for the stinger 1003 to move up and down. In one embodiment, the suspension systems 1086, 1087 are springs. In another embodiment, the suspension systems 1086, 1087 are air bags. In a further embodiment, the suspension systems 1086, 1087 are inner tubes.

Figure 16:
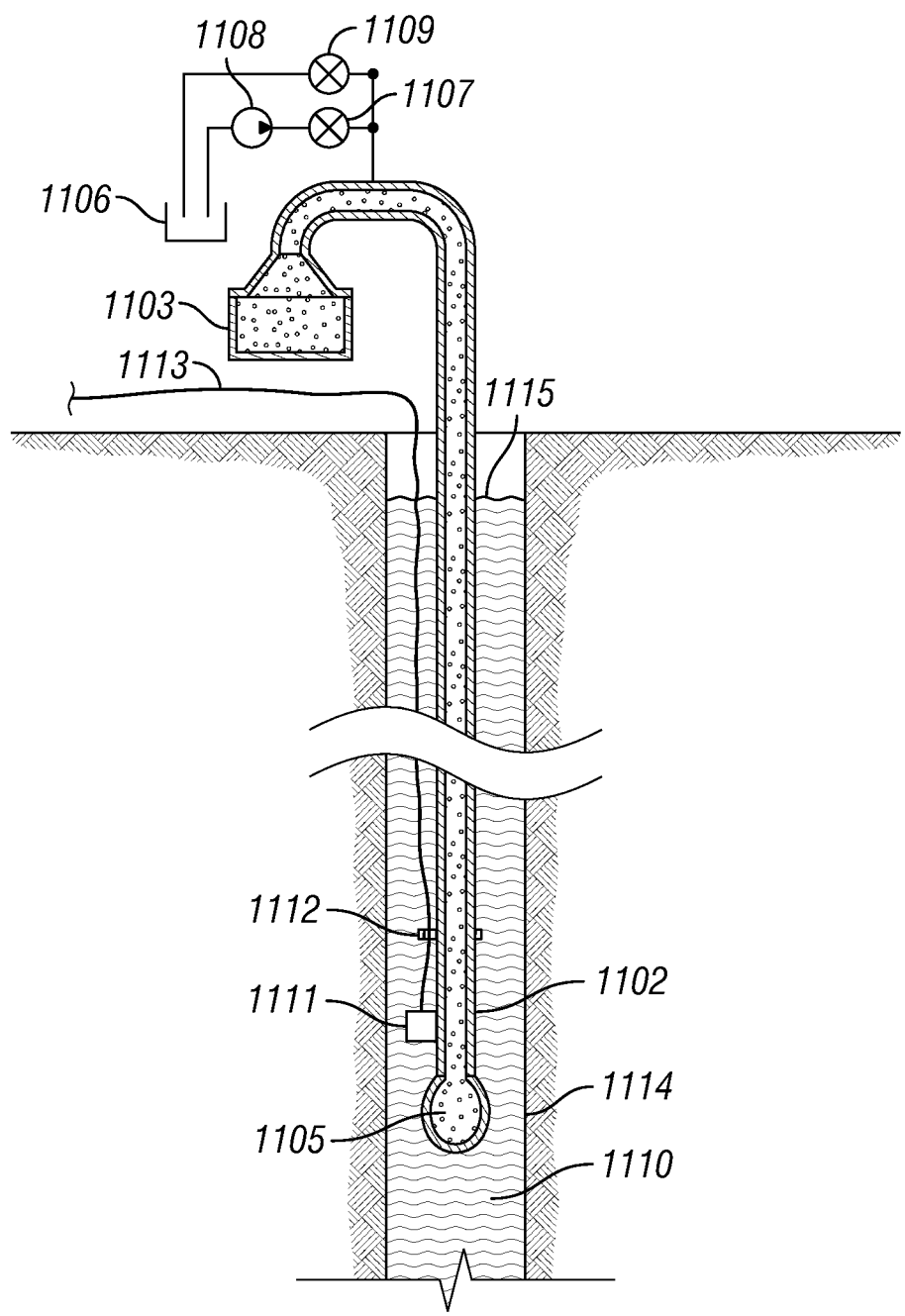
FIG. 16 is a cross-sectional view of a system for coupling a tube wave source to a bore hole according to one embodiment of the current application.

FIG. 16 discloses a method of coupling a tube wave source 1103 through a free surface 1115 into a fluid filled wellbore 1114. In general, the coupling device comprises a string of tubes 1102 that has two ends: the first end is connected to the wave source 1103 located on the surface of a wellsite; the second end is hanging freely in the fluid of the wellbore 1114. In one embodiment, the second end of the tube 1102 comprises an expandable bag 1105, which can expand or contract depending on the pressure inside the bag 1105. In one embodiment, the tube 1102 is filled with fluid that is introduced by a pump 1108 through a valve 1107 from a reservoir 1106, all located on the surface of a wellsite. A valve 1009 can be optionally included to release air or excessive pressure in the tube 1102. A vacuum pump (not shown) can also be optionally included to facilitate the process of filing the tube 1102. The compliance of the bag 1105 allows the pressure at the surface of the tube wave source 1103 to be higher than it would be if the tube were open ended. In the event of a free surface 115 that is much lower than the height of the tube wave source 1103, the negative pressure that could be generated at the surface of the tube wave source 1103 would be severely limited by cavitation of the working fluid. In the case of water as a fill fluid in the tube, the free surface 1115 must be much less than 32 feet below the tube wave source 1103 for it to produce useful tube waves without the presence of the bag 1105.

In one embodiment, the fluid in the tube 1102 is the same as the fluid in the downhole 1110. In another embodiment, the fluid in the tube 1102 is slightly lower in density compared with the fluid in the downhole 1110. When the tube wave source 1003 is fired, a tube wave propagates down tube 1102 and causes bag 1105 to expand and contract, therefore coupling the tube wave source to the wellbore 1114. Optionally, a partial or complete seal (not shown) between the wellbore and the tubes 1102 may be provided above bag 1105. Optionally, a pressure transducer 1111 may be attached to tube 1102 with cable 1113 optionally attached to tube 1102 by device 1112.

Figure 17A:
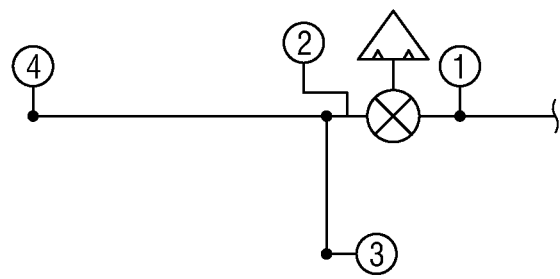
FIGS. 17A and 17B are diagrams illustrating tube waves generated by systems of the current application.
Figure 17B:
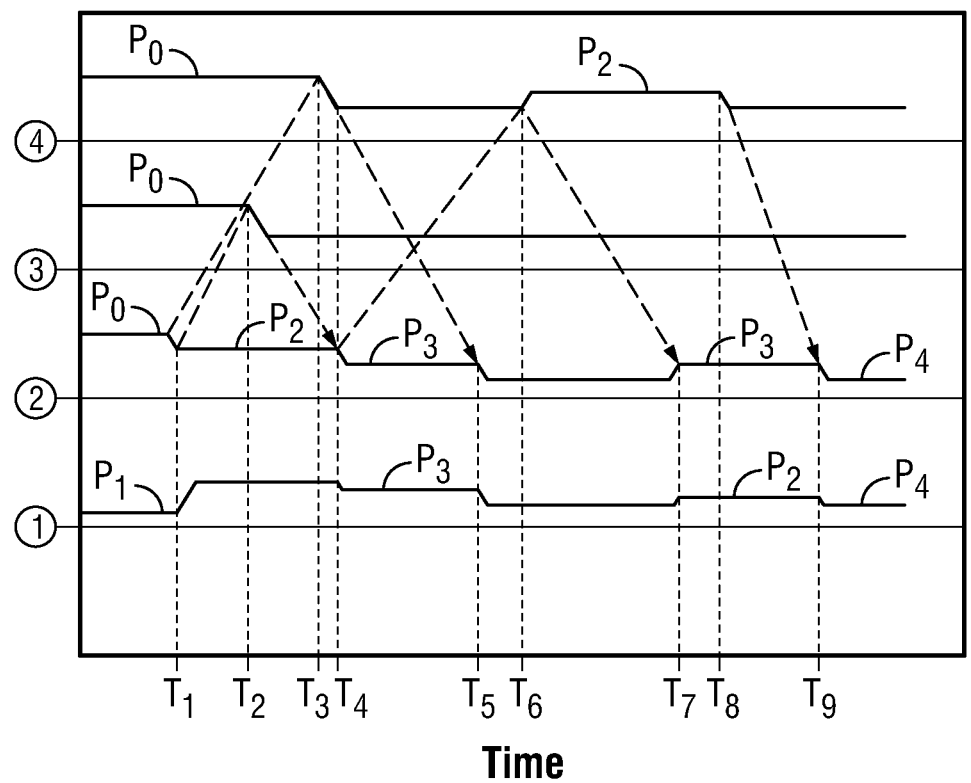

FIG. 17 shows the effect of using a long, tubular chamber whose tube wave transit time is comparable to the physical length of the pressure pulse. This is directly analogous to electrical transmission lines. In general, it is not desirable to have the pulse length and the chamber length to be comparable, as optimized storage chambers are generally larger in diameter than the conduit connected to them and tend to have a chamber length less than 20 to 30 times their bore. Such a structure would be used to produce tube waves of a particular shape. If this is desired, an optimized storage chamber may be placed at one or more locations along a length of normal pipe suited to this service. Appropriately placed changes in impedance of the outlet pipe may also be used to perform this sort of wave shaping. FIG. 17A shows the physical location of the pressure transducers 1, 2, 3, and 4. A fast valve is disposed between transducers 1 and 2. The length of pipe leading to transducer 3 is shorter than that leading to transducer 4. The closed pipework containing pressure transducers 2, 3, and 4 is pressurized to P0. The outlet pipe is pressurized to pressure P1. The graph shows the four pressure traces vs. time. The fast valve is opened at time T1 and is assumed to open in a period much less than the time between T1 and T2. When it opens, there is an immediate rise in pressure at transducer 1, to level P2 and a corresponding drop in transducer 2 down to level P2. The pressure wave travels toward transducers 3 and 4 as the fluid expands, indicated schematically by the arrows. At time T2, the pressure wave reaches transducer 3 and its pressure drops to level P2. A reflected wave returns from transducer 3 toward transducer 2. Similarly, the initial wave reaches transducer 4 at time T3. When this happens, the pressure falls to P2 and a reflected wave returns. When the reflected wave from transducer 3 reaches transducer 2 the pressure falls to P3, which is still above P1 due to continued fluid flow. This produces another reflected wave into the pipe to transducer 4. When the first reflected wave from transducer 4 reaches transducer 2 at time T5, the pressure drops to P4 (which will be equal to P1 if the outlet pipe system is much larger than the storage volume), as the flow out of the system has stopped temporarily. The first reflection from transducer 3 into the line to transducer 4 produces the short pulse seen between T7 and T9 on transducer 2. Other, smaller reflections may be present but are not shown. Diagrams similar to these are familiar to those skilled in the art of modeling electrical transmission lines. The methods of modeling transmission lines may be directly applied to tube wave lines once this analogy is understood.

FIG. 18 discloses a number of arrangements that can be used to fine tune the generation, delivery, and/or propagation of tube waves, based on the underlying similarity between tube waves and electromagnetic waves in transmission lines. These relationships are not generally known and more importantly, the physical configurations of the tube wave analogues to electrical transmission lines are not previously known as such. FIG. 18A discloses the tube wave equivalent of a transmission line terminated with a capacitor at its upper end. The tube wave system that has this behavior is a compliant chamber at the end of a pipe. Compliance may be provided by a cavity filled with the tubing fluid (as shown on the left) or an accumulator (as shown on the right). FIG. 18B shows the tube wave equivalent of a transmission line terminated with a shorted end; a closed end pipe. FIG. 18C shows a slug of material 1330 with a density that is higher than the fluid hardware and transmission lines. The slug 1330 is configured to be able to move up and down inside the tube 1301 with the pulsation of the tube waves. In one embodiment, the slug 1330 is used to produce a lumped equivalent of an inductance placed between two transmission line segments, in a tube wave system.

Figure 18A:
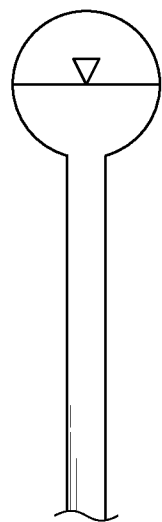
FIGS. 18A-18I illustrate various examples of tube wave manipulation apparatuses according to embodiments of the current application.
Figure 18B:
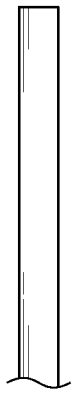
Figure 18C:
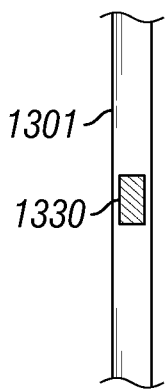
Figure 18D:
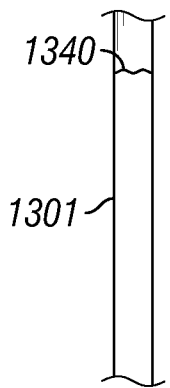
Figure 18E:
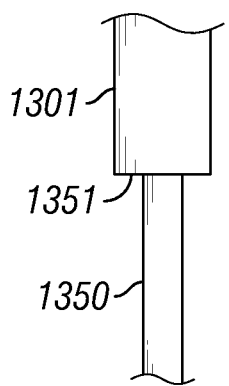
Figure 18F:
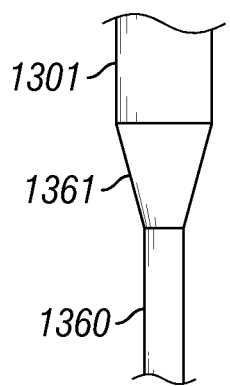

FIG. 18D shows a tube 1301 having a free surface 1340 near the top of the tube 1301. The free surface 1340 functions equivalently to an open circuited end on a transmission line. By way of example, a positive tube wave impinging on this boundary will rebound as a negative tube wave. In the case of a transmission line, a positive pulse impinging on an open-circuited transmission line end will reflect as a negative pulse. FIG. 18E shows a tube 1301 having a reduced diameter towards a section 1350 further downstream from the surface, therefore creating a shoulder 1351 which may function as a reflector and as an attenuator. Tube waves coming from side 1301 will be strongly reflected off of the step in diameter 1351 and only part of the wave amplitude will pass into the smaller section 1350. The transmission line analogy is a junction between two transmission lines of different characteristic impedance, such as a 75 Ohm line connected directly to a 50 ohm line. Just as in the transmission line world, the larger the step or change in characteristic impedance, the better the reflection and the less signal passes through. FIG. 18F shows a different version of FIG. 18E where the transition from the tube 1301 to the downstream section 1360 is by way of a slanted surface 1361 instead of a shoulder 1360. This structure is equivalent to two transmission lines of different impedance (as above), but coupled together by a matching transformer. With an appropriate transformer, the wave may be made to transition across the change in impedance without reflection and without energy loss. There will be a concurrent shift between pressure and velocity due to the different impedances, in the same manner that the transmission line matching transformer trades between voltage and current to keep the same power level on both ends. The efficiency of this section increases as the length of the transition increases, with little transformer action seen for transitions less than ¼ wave length.

Figure 18G:
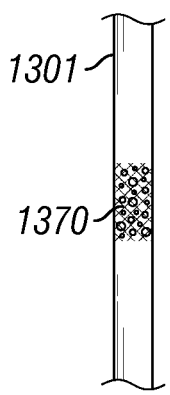
Figure 18H:
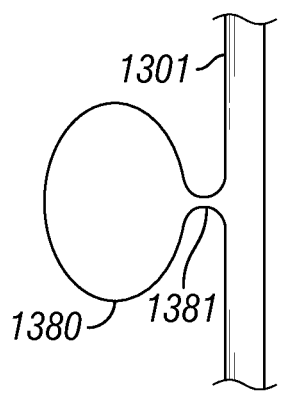
Figure 18I:
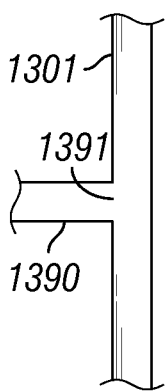

FIG. 18G shows a porous material 1370 inside the tube 1301. The porous material 1370 provides a lousy reflector, in a manner similar to two transmission lines connected together with a resistor. FIG. 18H shows a tube 1301 having a perforation 1381 formed on the side wall of the tubing 1301. In the illustrated embodiment, the perforation 1381 is connected to an enlarged area of enclosure 1380, which resembles a subterranean formation under hydraulic fracturing, for example. This provides a lousy reflector in a slightly different configuration and is equivalent to two transmission lines joined together with a load resistor placed across the transmission line terminals FIG. 18I shows a side branch 1391 connected to a pipe 1301 through a full-bore port 1391. This is electrically equivalent to two transmission lines joining with a third stub line. In this case the stub line would be open circuited. Such structures can be used to provide impedance matching at specific frequencies and or to provide a frequency selective reflector. They are also referred to as stub filters.

FIG. 19 discloses a number of exemplary terminators that can be used to attenuate tube waves after use or reduce their reflections. Embodiments discloses herein may be applicable in attenuating pulsations in hydraulic fracturing operations where excessive pulsations in the fracturing fluids may be damaging to the pump system. Such terminators are equivalent to the terminating resistors or terminating systems commonly employed in transmission line systems to avoid end reflections.

Figure 19A:
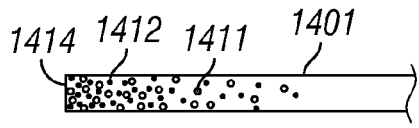
FIGS. 19A-19C illustrate various examples of tube wave terminators according to embodiments of the current application.

Specifically, FIG. 19A shows a tube 1401 having a closed end 1414. Two types of particles are mixed together and packed into the space created by the closed end 1414 and the side walls of the tube 1401. The first type of the particles is dense particles 1412. The second type of the particle is compressible particles 1411. The dense particles 1412 can rub against each other and the inner wall of the tube 1401. The compressible particles 1411 allow the pack to move back and forth within the tube 1401 and absorb the pulse energy. In one embodiment, the compressible particles 1411 are spheres of low bulk modulus. In another embodiment, the compressible particles 1411 are encapsulated alcohol or rubber balls. In a third embodiment, the packing density of one or more particles is caused to vary from very densly packed at the closed end 1414 to low density at the opposite end. Such a structure would minimize reflections even in the instance that the characteristic resistance of the pack is not equal to the characteristic impedance of the tube wave conduit. Other variations can also be used, and should be considered within the scope of the current disclosure. The key characteristics being the ability to absorb energy and having porosity.

Figure 19B:
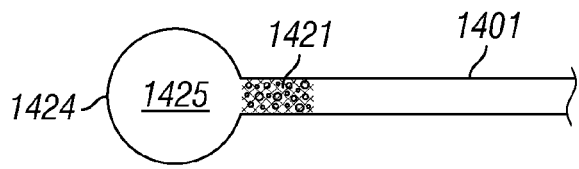

In FIG. 19B, a tube 1401 terminates upon a cavity 1424. The cavity 1424 as illustrated in FIG. 19B is in a spherical shape, although other shaped cavity can be used in the current application as well. A complaint fluid can be used to fill up the cavity 1424, such as air, alcohol, etc. A porous plug 1421 is provided inside the tube 1401, at a location proximate to the cavity 1424. The porous plug 1421 can be made of a porous material commonly known in the art. The porous plug 1421 together with the compliance material in the cavity 1424 can function as an effective terminator of tube waves. In a further embodiment, the compliant cavity can comprise an accumulator to reduce the required volume of the system. Such a system is equivalent to a transmission line terminated with a series combination of a resistor and a capacitor. Such a terminator has a frequency response characteristic that is attenuates high frequencies and does not attenuate low frequencies. With a large capacitor (or equivalently a large compliant volume), this system will not attenuate constant pressures but will strongly attenuate varying pressures.

Figure 19C:
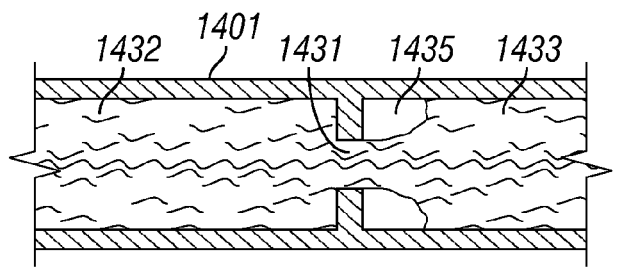
Figure 20:
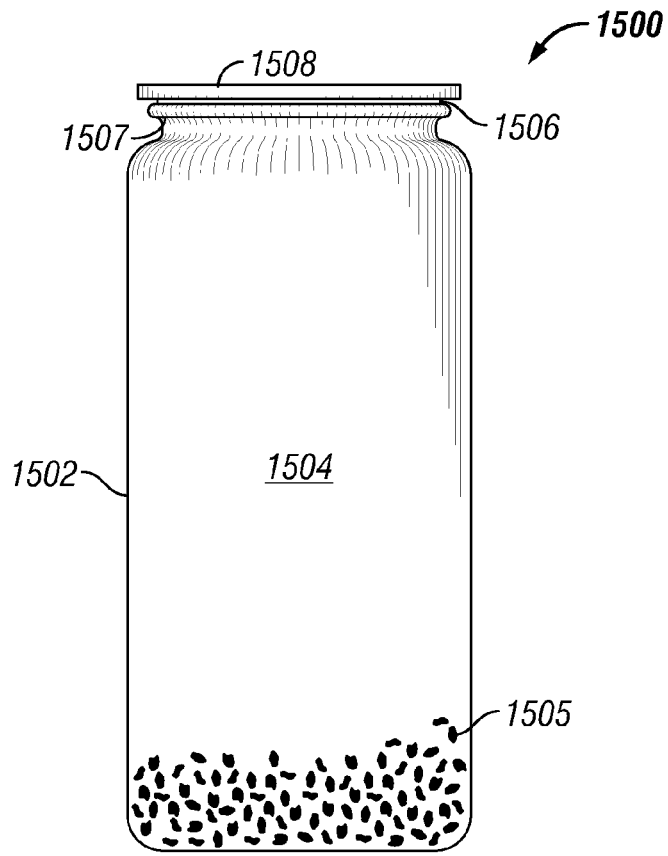
FIG. 20 is a cross-sectional view of an imploding apparatus for generating tube waves according to one embodiment of the current application.

FIG. 19C shows another tube wave structure. There, an orifice 1431 is created inside the tube 1401, which only allows a portion of the fluid to pass from an upstream chamber 1432 to the downstream chamber 1433. When the fluid flows sufficiently fast, and/or when the orifice 1431 is of a give size, cavitation 1435 is created behind the orifice 1431. This cavitation 1435 is effective in blocking tube waves traveling from the downstream chamber 1433 towards the upstream chamber 1432, but not tube waves traveling in the reverse direction. By varying the flow rate and/or the orifice size, this structure may be made to either allow passage or block passage of tube waves in one direction while always passing tube waves in the other direction. Electrically, this structure is similar to either two transmission lines coupled by a diode in series, or a directional coupler FIG. 20 illustrates another source of tube waves that involves an imploding device such as a canister 1500. In the depicted embodiment, a simple canister 1500 in the cross-sectional view includes a hollow body 1502 which defines an inner chamber 1504. The chamber 1504 may be a vacuum, or be filled with gas at zero to low pressure. The canister body 1502 can be made from any crushable and/or drillable material, such as frangible glass, tempered glass, or ordinary glass. In one embodiment, the canister body 1502 is a glass centrifugal tube. Although in FIG. 20 a tubular body is depicted, spherical and other shapes may be utilized. In particular, canister shape may be selected for ease of movement within the well, and also for producing particular acoustic characteristics.

The illustrated canister body has an opening 1507 adapted to receive a pressure rupture disk 1508. The opening may be threaded such that a pressure rupture disk with a threaded holder can be mated in the field to yield a canister of selected implosion value. Alternatively, the disk 1508 is securely fastened to the opening 1507 of the canister 1500 by a layer of glue 1506, cement, solder, or other attachment methods familiar to those skilled in the art. Weighing materials 1505 such as bauxite or lead beads can be packed in the canister chamber 1504 to increase the weight of the canister 1500 so it may descend in the wellbore fluid without making the assembly difficult to drill with ordinary well drilling tools.

Several different types of rupture disks 1508 were tested. In some cases, the rupture disks 1508 were microscope cover slips. In some other cases, the rupture disks 1508 were plastic lids. In some additional cases, the rupture disks 1508 were ceramic disks. In some further cases, the rupture disks 1508 were glass disks or heavy glass disks. Among all the disks tested, microscope cover slips performed exceptionally well because of their precise thickness and consistently high quality.

FIG. 21 shows an example of data gathered by using a centrifuge tube covered by a microscope slide. The yellow trace was recorded by a surface hydrophone; the black trace is recorded by a DVS sensor.

The preceding description has been presented with reference to some illustrative embodiments of the Inventors' concept. Persons skilled in the art and technology to which this application pertains will appreciate that alterations and changes in the described structures and methods of operation can be practiced without meaningfully departing from the principle, and scope of this application. Accordingly, the foregoing description should not be read as pertaining only to the precise structures described and shown in the accompanying drawings, but rather should be read as consistent with and as support for the following claims, which are to have their fullest and fairest scope.

We claim:

1. A system, comprising:

an energy storage chamber that comprises a compressible medium at a first pressure;

a pipe at a second pressure connected to a liquid-filled borehole containing a liquid therein and penetrating a subterranean formation, wherein the second pressure is a high pressure above atmospheric pressure that is suitable for use in hydraulic fracturing treatment of the subterranean formation or that is provided by the subterranean formation itself, and wherein the first pressure is substantially different from the second pressure; and a fast operating valve connected to each of the energy storage chamber and the pipe;

wherein the valve is configured to open and close a flow path between the energy storage chamber and the pipe through the valve to generate a tube wave in the liquid-filled borehole, wherein the pressure of the compressible medium in the energy storage chamber is changed from the first pressure by the second pressure, and wherein the pressure of the compressible medium in the energy storage chamber is changed back to the first pressure by a charger connected to the energy storage chamber, wherein the compressible medium and the liquid are different mediums, wherein the fast operating valve is a regenerative valve having a moving element disposed therein, the moving element having a first area that is exposed to the first pressure and a second area that is exposed to the second pressure, wherein the moving element is configured to be held in a closed position upon a port until an external force is applied to move the moving element away from the port, and wherein, once the moving element is moved away from the port, one of the first pressure and the second pressure acts on the second area to push the moving element to a fully opened state.

2. The system of claim 1, wherein the valve comprises a control chamber, a treating chamber that is separate from the control chamber and is not in fluid communication with the control chamber, and a poppet that extends into each of the control chamber and the treating chamber and is capable of reciprocating within the control chamber and the treating chamber.

3. The system of claim 2, wherein the treating chamber is in fluid communication with each of the energy storage chamber and the fluid-filled borehole when the valve is in an open state.

4. The system of claim 3, wherein the poppet comprises a control piston disposed inside the control chamber, a treating seat disposed inside the treating chamber, and a stem connecting the control piston and the treating seat.

5. The system of claim 4, wherein the control piston is configured to move relative to a stem of the poppet.

6. The system of claim 4, wherein the treating seat is configured to engage a structure so as to seal off a fluid passage from the treating chamber to the fluid-filled borehole.

7. The system of claim 3, wherein the valve further comprises a buffering chamber that is separate from the control chamber and is not in fluid communication with the control chamber, wherein the poppet extends from the buffering chamber through the control chamber to the treating chamber and is capable of reciprocating within the buffering chamber, the control chamber, and the treating chamber, and wherein the poppet comprises a hollow passage that provides fluid communication between the buffering chamber and the fluid-filled borehole.

* * * * *